US 11,874,037 B2

(12) United States Patent
Yoshimi et al.

(10) Patent No.: US 11,874,037 B2
(45) Date of Patent: Jan. 16, 2024

(54) ADDITIONAL-FILLING-AMOUNT MANAGEMENT SYSTEM

(71) Applicant: DAIKIN INDUSTRIES, LTD., Osaka (JP)

(72) Inventors: Manabu Yoshimi, Osaka (JP); Shinichi Kasahara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 269 days.

(21) Appl. No.: 17/419,999

(22) PCT Filed: Jan. 24, 2020

(86) PCT No.: PCT/JP2020/002587
§ 371 (c)(1),
(2) Date: Jun. 30, 2021

(87) PCT Pub. No.: WO2020/158620
PCT Pub. Date: Aug. 6, 2020

(65) Prior Publication Data
US 2022/0074635 A1 Mar. 10, 2022

(30) Foreign Application Priority Data
Jan. 30, 2019 (JP) .................................. 2019-013713

(51) Int. Cl.
*F25B 15/00* (2006.01)
*G05B 15/02* (2006.01)
*F25B 45/00* (2006.01)

(52) U.S. Cl.
CPC .............. *F25B 45/00* (2013.01); *G05B 15/02* (2013.01); *F25B 2345/001* (2013.01); *F25B 2345/003* (2013.01)

(58) Field of Classification Search
CPC ................ F25B 45/00; F25B 2345/001; F25B 2345/003; F25B 13/00; F25B 2313/0233;
(Continued)

(56) References Cited

U.S. PATENT DOCUMENTS 4,856,288 A * 8/1989 Weber .................... F25B 41/385
62/149
5,201,188 A 4/1993 Sakuma
(Continued)

FOREIGN PATENT DOCUMENTS

EP  0 813 033 A1  6/1997
JP  57-33975 U  2/1982
(Continued)

OTHER PUBLICATIONS

International Preliminary Report of corresponding PCT Application No. PCT/JP2020/002587 dated Aug. 12, 2021.
(Continued)

*Primary Examiner* — Ramesh B Patel
(74) *Attorney, Agent, or Firm* — Global IP Counselors, LLP

(57) ABSTRACT

An additional-filling-amount management system includes a mass correlation data obtaining unit, an additional-filling-amount determination unit, and a storage unit. The mass correlation data obtaining unit obtains mass correlation data correlating with a mass of a refrigerant container from which refrigerant is supplied to a refrigeration cycle apparatus that is additionally filled with refrigerant. The additional-filling-amount determination unit determines an additional filling amount based on the mass correlation data, the additional filling amount being an amount of refrigerant, from the refrigerant container, with which the refrigeration cycle apparatus has been additionally filled. The storage unit stores apparatus information regarding the refrigeration cycle apparatus for which additional filling with refrigerant is completed and the additional filling amount that is the amount of refrigerant with which the refrigeration cycle apparatus identified with the apparatus information has been filled, in association with each other.

19 Claims, 9 Drawing Sheets

(58) Field of Classification Search
CPC ............ F25B 2345/007; F25B 2400/13; F25B 2500/24; G05B 15/02
See application file for complete search history.

(56) References Cited

U.S. PATENT DOCUMENTS

| | | | | |
|---|---|---|---|---|
| 11,402,137 | B2* | 8/2022 | Yoshimi | .................. F25B 40/00 |
| 2004/0055317 | A1* | 3/2004 | Nomura | .................. F25B 45/00 62/149 |
| 2009/0126375 | A1* | 5/2009 | Toyoshima | ........... F25B 49/005 62/529 |
| 2011/0036104 | A1* | 2/2011 | Toyoshima | ............. F25B 45/00 62/149 |
| 2013/0205806 | A1* | 8/2013 | McMasters | ............. F25D 15/00 62/125 |
| 2014/0174114 | A1* | 6/2014 | Tamaki | ................... F25B 45/00 62/129 |
| 2014/0260352 | A1 | 9/2014 | Murray | |
| 2018/0142928 | A1* | 5/2018 | Choi | ...................... F25B 43/006 |
| 2022/0065510 | A1* | 3/2022 | Yoshimi | .................. F25B 41/20 |

FOREIGN PATENT DOCUMENTS

| | | |
|---|---|---|
| JP | 4-103975 A | 4/1992 |
| JP | 1-63745 A | 3/1999 |
| JP | 2005-114184 A | 4/2005 |
| JP | 2010-25504 A | 2/2010 |
| JP | 2014-16138 A | 1/2014 |
| JP | 2017-53555 A | 3/2017 |
| JP | 6312697 B2 | 3/2018 |

OTHER PUBLICATIONS

International Search Report of corresponding PCT Application No. PCT/JP2020/002587 dated Mar. 10, 2020.
European Search Report of corresponding EP Application No. 20 74 9151.5 dated Dec. 9. 2021.

* cited by examiner

ADDITIONAL-FILLING-AMOUNT MANAGEMENT SYSTEM

CROSS-REFERENCE TO RELATED APPLICATION

The present application is related to co-pending application Ser. No. 17/429,287, filed on Aug. 6, 2021, now U.S. Pat. No. 11,402,137.

BACKGROUND

Field of the Invention

The present disclosure relates to an additional-filling-amount management system.

Background Information

As disclosed by, for example, Japanese Patent No. 6312697, a technique related to refrigerant filling support is available in the related art.

SUMMARY

Japanese Patent No. 6312697 discloses a technique related to refrigerant filling support but does not include an idea related to, for example, management of the amount of refrigerant that is actually supplied for additional filling at the site. Regarding, for example, a multi-air conditioner for buildings, a case is assumed where an outdoor unit that is filled in advance with refrigerant at a factory is additionally filled with refrigerant at the site at the time of construction or maintenance. In such a case, if the amount of refrigerant with which the multi-air conditioner has been additionally filled is not appropriate, for example, efficient operations may be hindered.

Currently, the weight of a refrigerant container for filling is measured with a scale before and after additional filling to determine the amount of change, and the result of measurement is manually recorded or input for management; however, such a method may involve human errors.

An additional-filling-amount management system according to a first aspect includes a mass correlation data obtaining unit, an additional-filling-amount determination unit, and a storage unit. The mass correlation data obtaining unit obtains mass correlation data. The mass correlation data is data correlating with the mass of a refrigerant container from which refrigerant is supplied to a refrigeration cycle apparatus that is additionally filled with refrigerant. The additional-filling-amount determination unit determines an additional filling amount on the basis of the mass correlation data. The additional filling amount is the amount of refrigerant, from the refrigerant container, with which the refrigeration cycle apparatus has been additionally filled. The storage unit stores apparatus information and the additional filling amount that is the amount of refrigerant with which the refrigeration cycle apparatus identified with the apparatus information has been filled, in association with each other. The apparatus information is information regarding the refrigeration cycle apparatus for which additional filling with refrigerant is completed.

Accordingly, when the refrigeration cycle apparatus is additionally filled with refrigerant, the mass correlation data correlating with the mass of the refrigerant container from which refrigerant is supplied is obtained, and the additional filling amount of refrigerant for the refrigeration cycle apparatus is determined on the basis of the obtained mass correlation data. As a result, regarding additional filling of the refrigeration cycle apparatus 1 with refrigerant performed at the installation site, the additional filling amount can be managed with high accuracy. Accordingly, it can be determined with high accuracy whether the additional filling amount is appropriate.

An additional-filling-amount management system according to a second aspect is the additional-filling-amount management system according to the first aspect, in which the mass correlation data is the weight of the refrigerant container. The mass correlation data obtaining unit is a scale that measures the weight of the refrigerant container.

An additional-filling-amount management system according to a third aspect is the additional-filling-amount management system according to the first aspect, in which the mass correlation data is the liquid level of refrigerant encapsulated in the refrigerant container. The mass correlation data obtaining unit is a sensor that detects the liquid level of the refrigerant encapsulated in the refrigerant container.

An additional-filling-amount management system according to a fourth aspect is the additional-filling-amount management system according to the first aspect, in which the mass correlation data is the weight of the refrigerant container. The mass correlation data obtaining unit communicates with a scale that measures the weight of the refrigerant container. The mass correlation data obtaining unit receives data regarding the result of measurement from the scale. Accordingly, when the refrigeration cycle apparatus is additionally filled with refrigerant, the mass correlation data correlating with the mass of the refrigerant container from which refrigerant is supplied can be obtained directly from the scale that measures the weight of the refrigerant container.

An additional-filling-amount management system according to a fifth aspect is the additional-filling-amount management system according to the first aspect, in which the mass correlation data is the weight of the refrigerant container. The mass correlation data obtaining unit is an image capturing unit. The image capturing unit captures an image of a display portion that displays the result of measurement by a scale that measures the weight of the refrigerant container. Accordingly, when the refrigeration cycle apparatus is additionally filled with refrigerant, the mass correlation data correlating with the mass of the refrigerant container from which refrigerant is supplied can be obtained by using the scale having no communication function.

An additional-filling-amount management system according to a sixth aspect is the additional-filling-amount management system according to any of the first to fifth aspects and further includes a display unit. The display unit displays the mass correlation data and/or the additional filling amount. Accordingly, when the refrigeration cycle apparatus is additionally filled with refrigerant, the operator can grasp the mass correlation data and/or the additional filling amount as appropriate.

An additional-filling-amount management system according to a seventh aspect is the additional-filling-amount management system according to any of the first to sixth aspects and further includes an advice information output unit. The advice information output unit outputs on the basis of the additional filling amount, advice information for the operator performing additional filling regarding an optimum filling amount of refrigerant, from the refrigerant container, with which the refrigeration cycle apparatus is to be filled. Accordingly, when the refrigeration cycle apparatus is additionally filled with refrigerant, the operator can grasp the advice information regarding the optimum filling amount as appropriate.

Here, the "advice information" is not limited as long as the advice information is information regarding an advice that is given to the operator regarding additional filling of the refrigeration cycle apparatus with refrigerant. For example, the advice information is information indicating as appropriate the details of an operation of a manual valve of the refrigerant container. Further, for example, the advice information is information indicating as appropriate a target value regarding the amount of refrigerant (additional filling amount) with which the refrigeration cycle apparatus is filled.

An additional-filling-amount management system according to an eighth aspect is the additional-filling-amount management system according to any of the first to seventh aspects and further includes a warning tone output unit. The warning tone output unit outputs a warning tone when the additional filling amount comes closer to a target value. Accordingly, when the refrigeration cycle apparatus is additionally filled with refrigerant, the operator can grasp as appropriate a situation where the additional filling amount comes closer to the target value.

An additional-filling-amount management system according to a ninth aspect is the additional-filling-amount management system according to any of the first to eighth aspects, in which the additional-filling-amount determination unit calculates the additional filling amount in accordance with an environmental condition. Accordingly, the additional filling amount can be calculated as appropriate in relation to the environmental condition.

An additional-filling-amount management system according to a tenth aspect is the additional-filling-amount management system according to any of the first to ninth aspects, in which the storage unit is installed at a remote site away from the refrigeration cycle apparatus. Accordingly, regarding additional filling of the refrigeration cycle apparatus 1 with refrigerant, the additional filling amount can be managed with high accuracy by using the storage unit disposed at the remote site away from the refrigeration cycle apparatus.

An additional-filling-amount management system according to an eleventh aspect is the additional-filling-amount management system according to any of the first to tenth aspects and further includes a management apparatus, a report creation unit, and a report transmission unit. The management apparatus includes the storage unit. The report creation unit creates a report.

The report is information that includes the apparatus information and information regarding the additional filling amount corresponding to the apparatus information. The report transmission unit transmits the report to the management apparatus. Accordingly, the report that includes the apparatus information and the information regarding the additional filling amount is transmitted to the management apparatus. As a result, regarding additional filling of the refrigeration cycle apparatus 1 with refrigerant, the additional filling amount can be managed with high accuracy by using the management apparatus disposed at the remote site away from the refrigeration cycle apparatus.

DETAILED DESCRIPTION OF EMBODIMENT(S)

Hereinafter, an embodiment of the present disclosure will be described. Note that the following embodiment is a specific example, is not intended to limit the technical scope, and can be changed as appropriate without departing from the spirit.

(1) Management System (Additional-Filling-Amount Management System)

Figure 1:
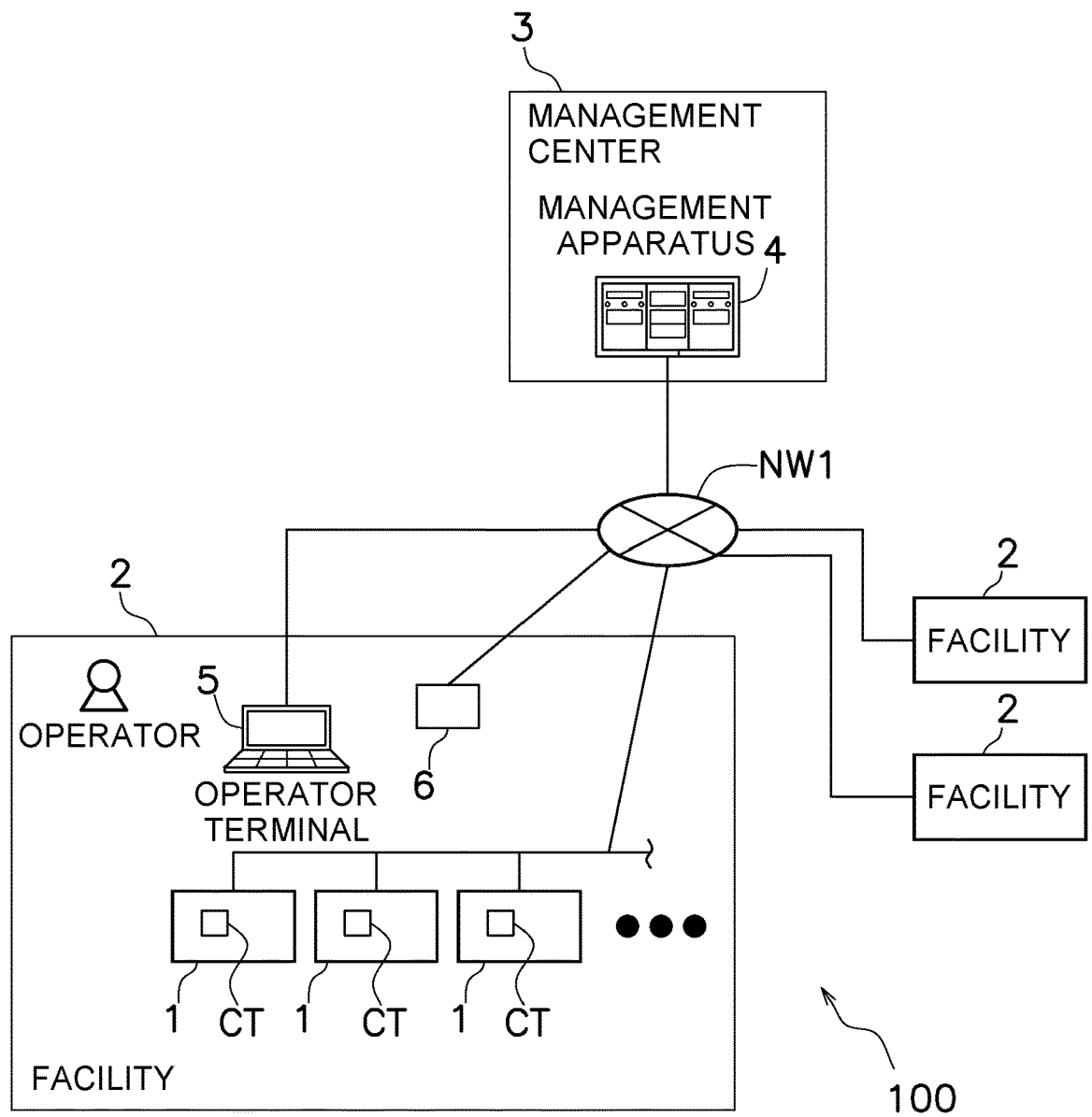
FIG. 1 is a schematic diagram illustrating a configuration form of a management system.
Figure 2:
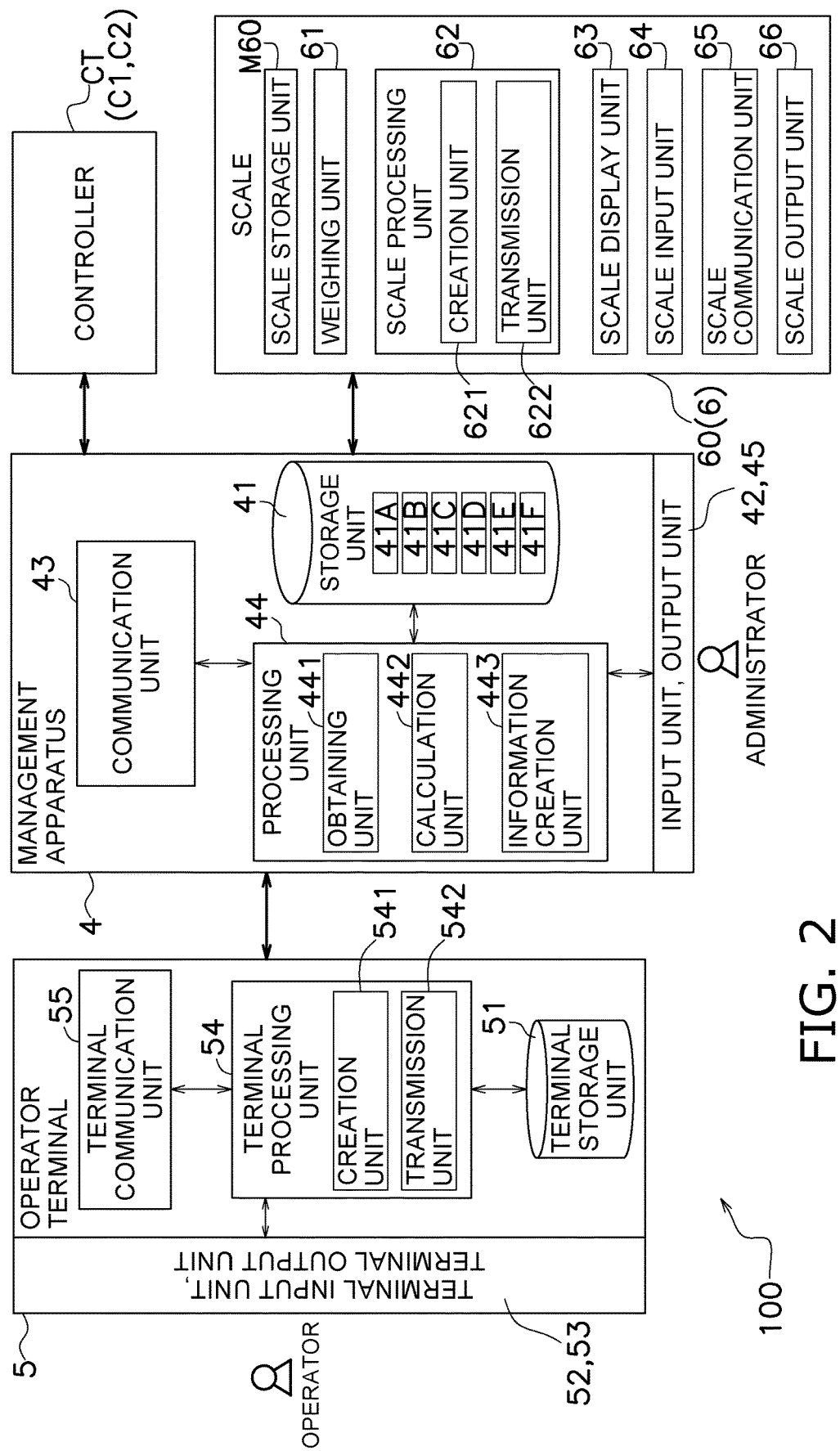
FIG. 2 is a block diagram illustrating an overall configuration of the management system.

FIG. 1 is a schematic diagram illustrating a configuration form of a management system 100. FIG. 2 is a block diagram illustrating an overall configuration of the management system 100.

The management system 100 is a system that manages, for a large number of refrigeration cycle apparatuses 1 including air conditioning apparatuses, chillers, dehumidifiers or water heaters or the like each having a refrigerant circuit, the amount of refrigerant with which the refrigerant circuit is filled (refrigerant filling amount). Hereinafter, the amount of refrigerant with which each refrigeration cycle apparatus 1 is additionally filled is referred to as "additional filling amount". Note that "management" described here includes at least one of, for example, accumulation of information, use of information, creation of information, control of devices, or monitoring as to whether the additional filling amount is appropriate.

The management system 100 includes a management apparatus 4. The management apparatus 4 manages information regarding the refrigerant filling amounts of the plurality of refrigeration cycle apparatuses 1 that are management targets. The management apparatus 4 is installed in a management center 3. In the administration area of the management center 3, a large number of facilities 2 exist. The facilities 2 include, for example, office building, commercial building, and condominium. In each facility 2, one or more refrigeration cycle apparatuses 1 are installed.

In the management system 100, the management apparatus 4 and devices including an operator terminal 5, a measuring device 6, and so on communicate with each other via a communication network NW1. The operator terminal 5 is an information processing device that is carried by an operator who fills each refrigeration cycle apparatus 1 with refrigerant. The operator terminal 5 is, for example, a laptop PC, a tablet PC, or a smartphone. The measuring device 6 is a device for measuring, when each refrigeration cycle apparatus 1 is additionally filled with refrigerant, the additional filling amount. Further, the management apparatus 4 communicates with each refrigeration cycle apparatus 1 via the communication network NW1. The management apparatus 4 obtains various types of information from devices including the refrigeration cycle apparatuses 1, the operator terminal 5, and the measuring device 6 to thereby individually manage the refrigerant filling amounts, which are the amounts of refrigerant with which the respective refrigeration cycle apparatuses 1 are filled.

The communication network NW1 includes a WAN (wide area network) that extends over a plurality of properties. For example, the communication network NW1 includes the Internet.

Note that the number of management apparatuses 4, the number of refrigeration cycle apparatuses 1, the number of operator terminals 5, and/or the number of measuring devices 6 can be changed as appropriate. Further, the number of facilities 2 and/or the number of management centers 3 can also be changed as appropriate.

(2) Refrigeration Cycle Apparatus

Figure 3:
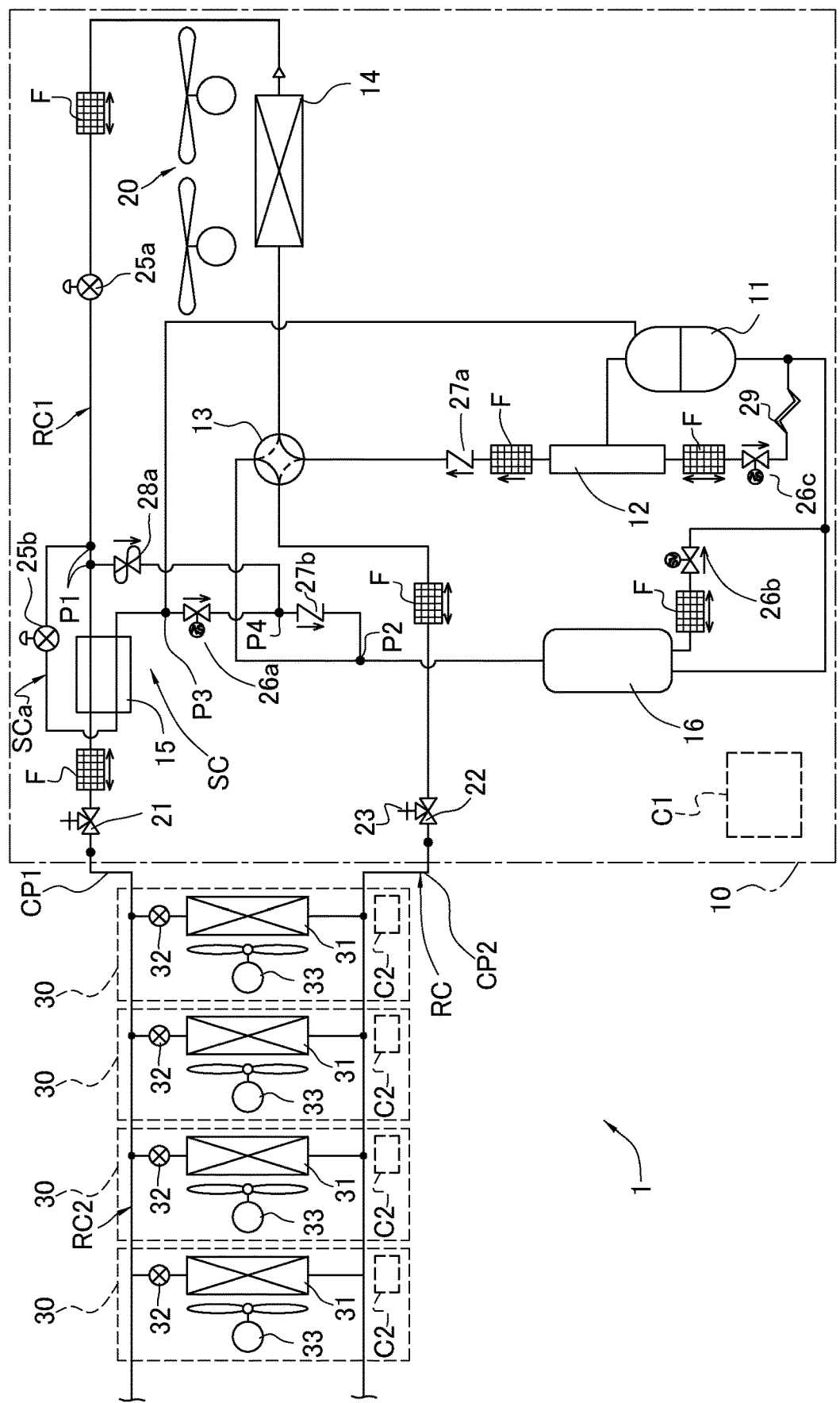
FIG. 3 is an overall configuration diagram of a refrigeration cycle apparatus.

Now, the refrigeration cycle apparatus 1 is described. As illustrated in FIG. 3, the refrigeration cycle apparatus 1 is an apparatus that performs a refrigeration cycle with refrigerant circulating through a refrigerant circuit RC. The refrigeration cycle apparatus 1 repeats a cycle that includes compression of refrigerant, heat release from refrigerant, decompression and expansion of refrigerant, and heat absorption into refrigerant. The refrigeration cycle apparatus 1 has a heat source unit 10, and a plurality of use units 30 that are connected to the heat source unit 10.

In a case where the heat source unit 10 is a heat source in which heat is released from refrigerant, each use unit 30 cools a target by using refrigerant absorbing heat. In a case where the heat source unit 10 is a heat source in which heat is absorbed into refrigerant, each use unit 30 heats a target by using refrigerant releasing heat.

The refrigeration cycle apparatus 1 is applicable to an air conditioning apparatus that performs cooling and heating and if this is the case, for example, the heat source unit 10 is an outdoor unit of the air conditioning apparatus and each use unit 30 is an indoor unit of the air conditioning apparatus. The use unit 30, which is an indoor unit, cools or heats air in an air conditioning target space to perform cooling or heating.

The refrigeration cycle apparatus 1 may be an apparatus other than an air conditioning apparatus. For example, the refrigeration cycle apparatus 1 may be a heat pump chiller, a heat pump water heater, or a refrigerator.

Figure 4:
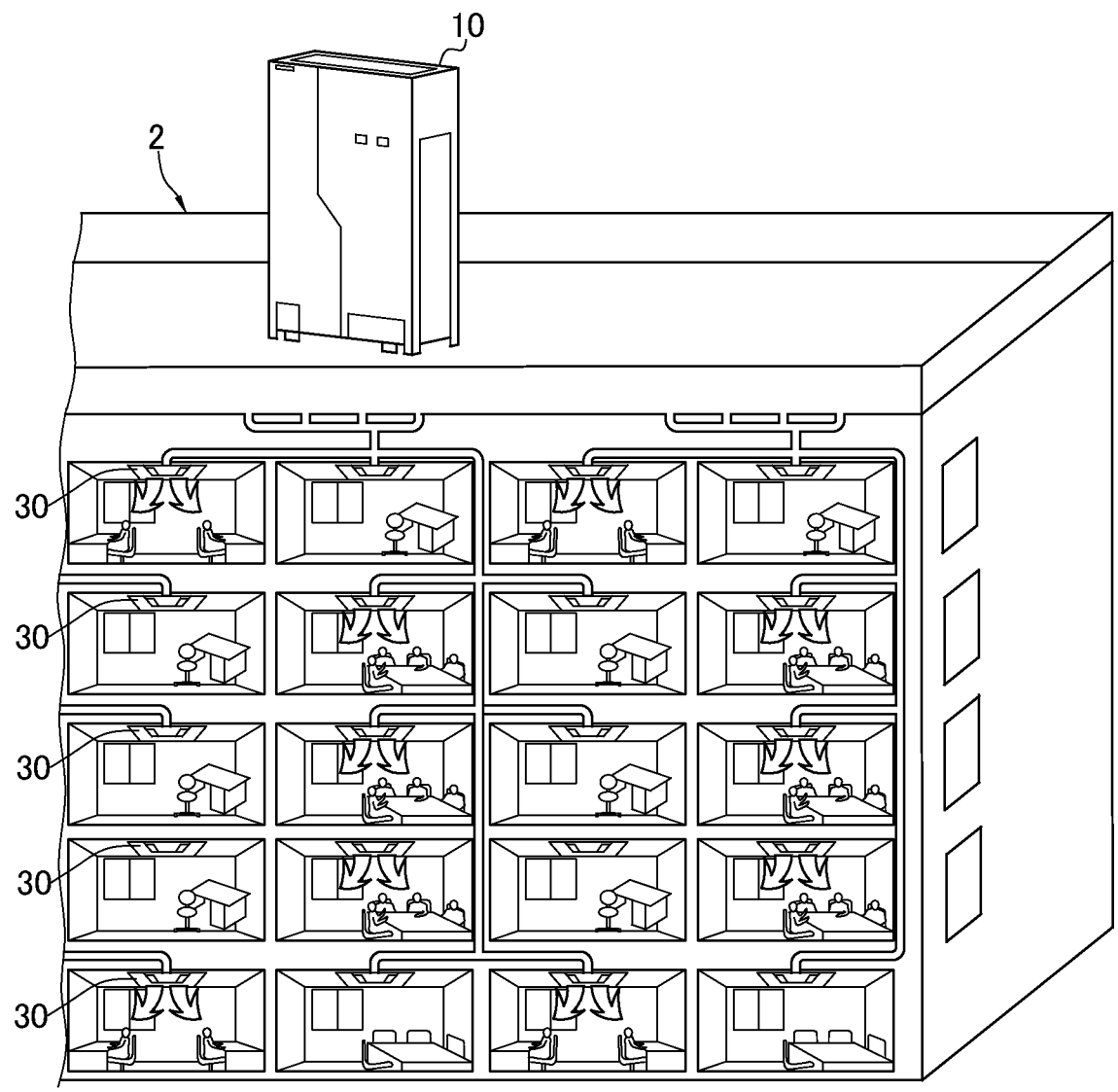
FIG. 4 is a schematic diagram illustrating an example where the refrigeration cycle apparatus is installed in a building.

FIG. 4 illustrates an example where the refrigeration cycle apparatus 1 is installed in the facility 2. In FIG. 4, the heat source unit 10 is installed on the rooftop of the facility 2. However, the form in which the heat source unit 10 is disposed is not limited to this and, for example, the heat source unit 10 may be disposed in, for example, a basement or a machine chamber. The plurality of use units 30 are installed in respective rooms to perform air conditioning of the rooms in the facility 2. Note that the number of heat source units 10 and/or the number of use units 30 included in the refrigeration cycle apparatus 1 are set as appropriate in accordance with the installation environment or engineering specifications. A plurality of heat source units 10 may be included in the refrigeration cycle apparatus 1.

The heat source unit 10 is filled with a predetermined amount of refrigerant (initial filling amount) at the time of shipment. In other words, when the refrigeration cycle apparatus 1 is installed, the heat source unit 10 is filled with refrigerant in an amount equivalent to the initial filling amount. Note that the initial filling amount is set as appropriate in accordance with the installation environment or engineering specifications.

The refrigeration cycle apparatus 1 is additionally filled with refrigerant when installed. The amount of refrigerant (additional filling amount) to be added after installation of the refrigeration cycle apparatus 1 is calculated as appropriate by using, for example, a predetermined calculation expression in accordance with, for example, the installation environment of the refrigeration cycle apparatus 1, the installation form of each use unit 30, and the installation form of connection pipes CP1 and CP2. The refrigeration cycle apparatus 1 is additionally filled with refrigerant by connecting the heat source unit 10 and a refrigerant container 80 by a charge hose 70.

In the refrigeration cycle apparatus 1, one heat source unit 10 and a plurality of use units 30 are connected by the connection pipes CP1 and CP2. In the refrigeration cycle apparatus 1, a heat-source-side circuit RC1 in the heat source unit 10 and a use-side circuit RC2 in the use units 30 are connected to each other to form the refrigerant circuit RC. In the refrigeration cycle apparatus 1, refrigerant circulates through the refrigerant circuit RC and a vapor compression refrigeration cycle is repeated accordingly.

(2-1) Heat Source Unit

The heat source unit 10 has a compressor 11, an oil separator 12, a four-way valve 13, a heat-source-side heat exchanger 14, a subcooling heat exchanger 15, an accumulator 16, a heat-source-side fan 20, a high-pressure-side shutoff valve 21, a low-pressure-side shutoff valve 22, a charge port 23, a first expansion valve 25a and a second expansion valve 25b, a first electromagnetic valve 26a to a third electromagnetic valve 26c, a first check valve 27a to a fourth check valve 27d, a first pressure regulating valve 28a to a third pressure regulating valve 28c, a capillary tube 29, and a plurality of filters F.

The heat-source-side heat exchanger 14 is, for example, a fin-and-tube heat exchanger and performs heat exchange between air and refrigerant. The subcooling heat exchanger 15 is, for example, a plate heat exchanger or a double-pipe heat exchanger. The first electromagnetic valve 26a to the third electromagnetic valve 26c open and close a refrigerant flow path. The first pressure regulating valve 28a to the third pressure regulating valve 28c maintain the pressure of refrigerant on the upstream side to a predetermined absolute value determined in advance. The arrows added to the first pressure regulating valve 28a to the third pressure regulating valve 28c point the downstream side of the first pressure regulating valve 28a to the third pressure regulating valve 28c. The filters F remove foreign matters from refrigerant that passes therethrough.

The discharge side of the compressor 11 is connected to the first port of the four-way valve 13 via the oil separator 12 and the first check valve 27a. Refrigerant discharged from the compressor 11 passes through the oil separator 12 in which oil is separated therefrom and flows toward the first port of the four-way valve 13. The second port of the four-way valve 13 is connected to one inlet-outlet of the heat-source-side heat exchanger 14, the third port of the four-way valve 13 is connected to the inlet of the accumulator 16, and the fourth port of the four-way valve 13 is connected to the low-pressure-side shutoff valve 22. In the four-way valve 13, the first port and the second port communicate with each other and the third port and the fourth port communicate with each other as represented by solid lines during a forward cycle operation, and the first port and the fourth port communicate with each other and the second port and the third port communicate with each other as represented by dashed lines during a reverse cycle operation.

The other inlet-outlet of the heat-source-side heat exchanger 14 is connected to one end of the first expansion valve 25a and is connected to the high-pressure-side shutoff valve 21 via the first expansion valve 25a. Between the other end of the first expansion valve 25a and the high-pressure-side shutoff valve 21, the subcooling heat exchanger 15 is disposed. The first expansion valve 25a is provided on the liquid side of the heat-source-side heat exchanger 14 to regulate the degree of decompression of refrigerant that passes therethrough. The subcooling heat exchanger 15, a subcooling circuit SCa, and the second expansion valve 25b constitute a subcooling portion SC. The subcooling circuit SCa branches off at a branch point P1 in a portion that extends from the other end of the first expansion valve 25a toward the high-pressure-side shutoff valve 21, passes through the subcooling heat exchanger 15, and comes to a junction point P2 between the four-way valve 13 and the accumulator 16. The second expansion valve 25b provided between the branch point P1 and the subcooling heat exchanger 15 regulates the degree of decompression of refrigerant that passes through the subcooling circuit SCa. The subcooling heat exchanger 15 causes heat exchange to be performed between refrigerant that flows between the branch point P1 and the high-pressure-side shutoff valve 21 and refrigerant that flows from the branch point P1 toward the junction point P2 in the subcooling circuit SCa.

In the subcooling circuit SCa, from the subcooling heat exchanger 15 toward the junction point P2, a branch point P3, the first electromagnetic valve 26a, a junction point P4, and the second check valve 27b are provided in this order. The branch point P1 and the junction point P4 are connected to each other via the first pressure regulating valve 28a, and refrigerant flows from the branch point P1 toward the junction point P4. The branch point P3 is connected to the injection port of the compressor 11. In relation to this, refrigerant decompressed at the second expansion valve 25b and having an intermediate pressure exits from the subcooling heat exchanger 15, branches off upstream of the first electromagnetic valve 26a, and flows into the injection port of the compressor 11.

One outlet of the accumulator 16 is directly connected to the intake side of the compressor 11 in order to return gas refrigerant to the intake side of the compressor 11, and the other outlet of the accumulator 16 is connected to the intake side of the compressor 11 via the filter F and the second electromagnetic valve 26b in order to return oil. Between the intake side of the compressor 11 and the oil separator 12, a path that passes through the filter F, the third electromagnetic valve 26c, and the capillary tube 29 is formed in order to return separated oil to the compressor 11.

For the heat-source-side heat exchanger 14, the heat-source-side fan 20 is disposed. The heat-source-side fan 20 generates in the heat-source-side heat exchanger 14 an airflow for accelerating heat exchange.

The filter F is provided between the oil separator 12 and the first check valve 27a, between the heat-source-side heat exchanger 14 and the first expansion valve 25a, between the subcooling heat exchanger 15 and the high-pressure-side shutoff valve 21, between the fourth port of the four-way valve 13 and the low-pressure-side shutoff valve 22, between the other outlet of the accumulator 16 and the second electromagnetic valve 26b, and between the oil separator 12 and the third electromagnetic valve 26c.

The charge port 23 is provided at the low-pressure-side shutoff valve 22. To the charge port 23, the charge hose 70 for sending refrigerant from the refrigerant container 80 is connected at the time of filling with refrigerant. Note that the position where the charge port 23 is disposed can be changed as appropriate.

In the heat source unit 10, a heat-source-side control unit C1 that controls operations of each portion in the heat source unit 10 is disposed. The heat-source-side control unit C1 has various electric components for controlling each actuator, a communication module for communicating with other devices, and a microcomputer that includes an MPU and a memory. The heat-source-side control unit C1 is electrically connected to a plurality of sensors disposed in the heat source unit 10 and obtains the results of detection by the sensors. The heat-source-side control unit C1 is connected to a use-side control unit C2 described below such that communication is possible and cooperates with the use-side control unit C2 to constitute a controller CT that controls operations of the refrigeration cycle apparatus 1.

(2-2) Use Unit

Each use unit 30 includes a use-side heat exchanger 31, a use-side expansion valve 32, and a use-side fan 33. The use-side heat exchanger 31 is, for example, a fin-and-tube heat exchanger and causes heat exchange to be performed between air and refrigerant. Between the connection pipe CP1 on the liquid side and the connection pipe CP2 on the gas side, the use-side expansion valve 32 and the use-side heat exchanger 31 are connected in series. The use-side expansion valve 32 and the use-side heat exchanger 31 are disposed in this order from the connection pipe CP1 on the liquid side toward the connection pipe CP2 on the gas side.

For each use-side heat exchanger 31, the use-side fan 33 is disposed. The use-side fan 33 generates in the use-side heat exchanger 31 an airflow for accelerating heat exchange. The plurality of use units 30 connected in parallel between the connection pipe CP1 on the liquid side and the connection pipe CP2 on the gas side constitute the use-side circuit RC2.

In each use unit 30, the use-side control unit C2 that controls operations of each portion in the use unit 30 is disposed. The use-side control unit C2 has various electric components for controlling each actuator, a communication module for communicating with other devices, and a microcomputer that includes an MPU and a memory. The use-side control unit C2 is connected to a sensor disposed in the use unit 30 and obtains the result of detection.

(2-3) Forward Cycle Operation

The refrigeration cycle apparatus 1 performs a forward cycle operation when cooling a target. In the forward cycle operation, the four-way valve 13 is controlled so as to be in a state where the first port and the second port communicate with each other and the third port and the fourth port communicate with each other (a state of the four-way valve 13 represented by solid lines in FIG. 3). In the forward cycle operation, the heat-source-side heat exchanger 14 functions as a radiator, and the use-side heat exchanger 31 functions as an evaporator. Refrigerant discharged from the compressor 11 circulates through the heat-source-side heat exchanger 14, the use-side expansion valve 32, and the use-side heat exchanger 31 sequentially to repeat a vapor compression refrigeration cycle that includes compression, condensation, expansion, and evaporation.

In the forward cycle operation, the operation frequency of the compressor 11 is controlled such that the evaporation pressure or the evaporation temperature in the use-side heat exchanger 31 is equal to a target pressure or a target evaporation temperature. Further, the opening degree of each use-side expansion valve 32 is controlled such that the degree of superheating of refrigerant that flows through the gas side of the use-side heat exchanger 31 is equal to a target degree of superheating. In the forward cycle operation, the first expansion valve 25a is controlled so as to be in a full-open state. In the forward cycle operation, the opening degree of the second expansion valve 25b is regulated such that the degree of superheating of refrigerant that exits from the subcooling heat exchanger 15 is equal to a target degree of superheating. Further, in the forward cycle operation, when a predetermined condition is satisfied, gas refrigerant having an intermediate pressure and subjected to heat exchange, in the subcooling heat exchanger 15, with refrigerant that flows between the branch point P1 and the high-pressure-side shutoff valve 21 is supplied from the injection port to a compression chamber, which is in the midst of compression, in a compression mechanism of the compressor 11. The compressor 11 supplied with the intermediate-pressure gas refrigerant can make the discharge temperature lower than in a case where gas refrigerant is not injected.

(2-4) Reverse Cycle Operation

The refrigeration cycle apparatus 1 performs a reverse cycle operation when heating a target. In the reverse cycle operation, the four-way valve 13 is controlled so as to be in a state where the first port and the fourth port communicate with each other and the second port and the third port communicate with each other (a state of the four-way valve 13 represented by dashed lines in FIG. 3). In the reverse cycle operation, the heat-source-side heat exchanger 14 functions as an evaporator, and the use-side heat exchanger 31 functions as a radiator.

Refrigerant discharged from the compressor 11 circulates through the use-side heat exchanger 31, the first expansion valve 25a, and the heat-source-side heat exchanger 14 sequentially to repeat a vapor compression refrigeration cycle that includes compression, condensation, expansion, and evaporation.

In the reverse cycle operation, the second expansion valve 25b is controlled so as to be in a full-close state. In the reverse cycle operation, the operation frequency of the compressor 11 is controlled such that the condensation temperature in the use-side heat exchanger 31 is equal to a target condensation temperature. The opening degree of the use-side expansion valve 32 is controlled such that the degree of subcooling of refrigerant that flows through the liquid side of the use-side heat exchanger 31 is equal to a target degree of subcooling. The opening degree of the first expansion valve 25a is controlled such that the degree of superheating of refrigerant that flows through the gas side of the heat-source-side heat exchanger 14 is equal to a target degree of superheating.

(2-5) Additional Filling with Refrigerant

Figure 5:
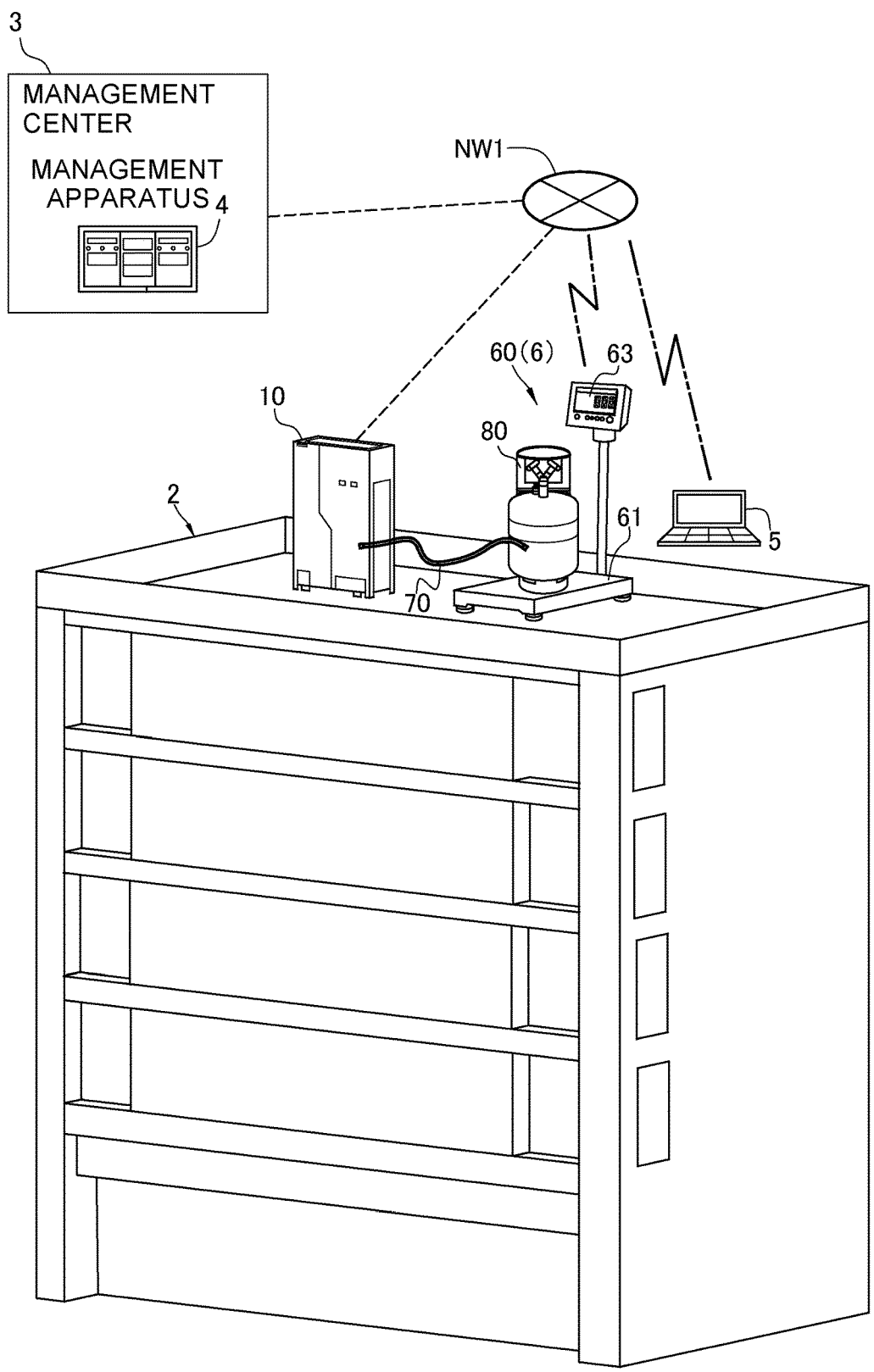
FIG. 5 is a schematic diagram illustrating an overview of an operation in which the refrigeration cycle apparatus is additionally filled with refrigerant.

FIG. 5 is a schematic diagram illustrating an overview of an operation in which the refrigeration cycle apparatus 1 is additionally filled with refrigerant.

Refrigerant that is used in the refrigeration cycle apparatus 1 is selected as appropriate in accordance with the installation environment or engineering specifications. In a case where, for example, the refrigeration cycle apparatus 1 is configured so as to be suitable for R410A refrigerant, any heat source unit 10 is configured so as to be suitable for R410A refrigerant. R410A refrigerant is mixed refrigerant that contains difluoromethane and pentafluoroethane. The refrigeration cycle apparatus 1 is designed to appropriately operate even if the mixture of difluoromethane and pentafluoroethane changes. In a case where the heat source unit 10 is additionally filled with refrigerant, the heat source unit 10 may be filled with R410A refrigerant or may be filled with difluoromethane or pentafluoroethane, which is an ingredient of R410A refrigerant. In other words, in a case where the refrigeration cycle apparatus 1 is suitable for mixed refrigerant, at the time of additional filling with refrigerant, the refrigeration cycle apparatus 1 may be refilled with the mixed refrigerant or may be refilled with refrigerant that is an ingredient of the mixed refrigerant.

Note that refrigerant that is used in the refrigeration cycle apparatus 1 is not limited to R410A refrigerant and may be another refrigerant. For example, R32 refrigerant may be used in the refrigeration cycle apparatus 1.

When the refrigeration cycle apparatus 1 is additionally filled with refrigerant, as illustrated in FIG. 5, the charge port 23 of the heat source unit 10 and the refrigerant container 80 are connected with each other by the charge hose 70. The charge hose 70 is a member for forming a flow path of refrigerant between the refrigerant container 80 and the refrigeration cycle apparatus 1. A manual valve of the refrigerant container 80 for supplying refrigerant and the charge port 23 of the heat source unit 10 are opened by an operator. The heat source unit 10 starts a forward cycle operation to drive the compressor 11, and refrigerant in the refrigerant container 80 is sent to the heat-source-side circuit RC1. The refrigerant flowing into the heat-source-side circuit RC1 via the charge port 23 passes through the accumulator 16 and is taken into the compressor 11. After the refrigeration cycle apparatus 1 has been filled with the refrigerant from the refrigerant container 80 in an amount equivalent to a target value of the additional filling amount, the manual valve of the refrigerant container 80 for supplying refrigerant and the charge port 23 are closed by the operator. The charge hose 70 is disconnected from the charge port 23, and the additional filling operation is completed. Note that the opening degree of the manual valve of the refrigerant container 80 for supplying refrigerant or the opening degree of the charge port 23 of the heat source unit 10 is narrowed by the operator as the amount of refrigerant, from the refrigerant container 80, with which the refrigeration cycle apparatus 1 has been filled comes closer to the target value.

Note that the operation for additional filling with refrigerant (additional filling operation) is performed by the operator in accordance with a predetermined construction procedure manual. The construction procedure manual specifies that when an additional filling operation is performed, the weight of the refrigerant container 80 from which refrigerant for additional filling is supplied is to be measured by using the measuring device 6 before and after additional filling.

The construction procedure manual further specifies that when additional filling with refrigerant is performed, the operator is to transmit to the management apparatus 4 via the operator terminal 5 or the measuring device 6 information (additional-filling-operation performing notification) for giving a notification that an additional filling operation is performed. It is specified in the construction procedure manual that the additional-filling-operation performing notification is to include information (apparatus information) regarding the refrigeration cycle apparatus 1 for which additional filling is performed and (refrigerant type identification information) for identifying the type of refrigerant for filling. In response to transmission of the additional-filling-operation performing notification, the management apparatus 4 establishes a communication connection with the operator terminal 5 and/or the measuring device 6.

The apparatus information includes information for identifying the refrigeration cycle apparatus 1. The apparatus information further includes information for identifying the operation state of the refrigeration cycle apparatus 1. For example, the apparatus information includes information for identifying the number of revolutions of the compressor 11 and information for identifying detection values obtained by various sensors. The apparatus information further includes information for identifying the model, capacity, dimensions, and so on of each of the heat source unit 10, the use units 30, and/or the connection pipes CP1 and CP2 included in the refrigeration cycle apparatus 1. The apparatus information further includes information for identifying the installation environment (environmental conditions) of the refrigeration cycle apparatus 1. The "information for identifying the installation environment" is not limited as long as the information for identifying the installation environment is information regarding the environment in which the refrigeration cycle apparatus 1 for which additional filling with refrigerant is performed is installed, and is, for example, information regarding the property (facility 2) in which the refrigeration cycle apparatus 1 for which additional filling with refrigerant is performed is installed. Further, for example, the "information for identifying the installation environment" is information for identifying the floor plan, the number of floors, the floor area, the installation form of refrigerant pipes, and so on of the facility 2. Here, the "installation form of refrigerant pipes" includes, for example, the lengths of the connection pipes CP1 and CP2 that connect the heat source unit 10 and the use units 30 with each other and/or the level difference between the highest portion and the lowest portion of each of the connection pipes CP1 and CP2.

The construction procedure manual further specifies that when an additional filling operation with refrigerant is completed, the operator is to transmit to the management apparatus 4 via the operator terminal 5 or the measuring device 6 information (report) for reporting the form in which the completed additional filling operation is performed. For example, it is specified in the construction procedure manual that, regarding the refrigeration cycle apparatus 1 for which additional filling has been performed, the report is to include information (mass correlation data) correlating with the mass of the additional filling amount, in addition to the apparatus information and the refrigerant type identification information.

The mass correlation data is data correlating with the mass of the refrigerant container 80 from which refrigerant is supplied to the refrigeration cycle apparatus 1 that is additionally filled with refrigerant. The mass correlation data includes information for identifying the weight of the refrigerant container 80. In other words, the mass correlation data includes information for identifying the weight of refrigerant corresponding to the additional filling amount. For example, the mass correlation data includes a value for identifying a change in the weight of the refrigerant container 80 between before and after the additional filling operation.

(3) Measuring Device

In the management system 100, the measuring device 6 is used to obtain the additional filling amount of refrigerant. In this embodiment, the measuring device 6 has a scale 60 illustrated in FIG. 5. As the scale 60, for example, a platform scale or a suspension scale is used. The scale 60 has a function of measuring the weight of the refrigerant container 80 and has a sufficient resolution for detecting the weight of refrigerant. The scale 60 wirelessly communicates with the management apparatus 4 via the communication network NW1. The scale 60 includes a scale storage unit M60, a weighing unit 61, a scale processing unit 62, a scale display unit 63, a scale input unit 64, a scale communication unit 65, and a scale output unit 66 as main units.

The scale storage unit M60 is for storing various types of information and is constituted by, for example, a nonvolatile memory and a volatile memory. For example, the scale storage unit M60 stores a program for executing various functions of the scale 60. Further, for example, the scale storage unit M60 stores information transmitted from the management apparatus 4 and other devices.

The weighing unit 61 measures the weight of a target object put thereon. The weighing unit 61 has various mechanisms and various elements for measuring the weight of a target object put thereon. On the weighing unit 61, for example, the refrigerant container 80 from which refrigerant for additional filling is supplied is put.

The scale processing unit 62 has a microcomputer that includes an MPU, a memory, and so on. The scale processing unit 62 performs various processes in accordance with a command input to the scale input unit 64. The scale processing unit 62, for example, performs A/D conversion for the result of measurement by the weighing unit 61 and performs various calculations. The scale processing unit 62, for example, outputs the result of measurement by the weighing unit 61 via the scale display unit 63.

Further, for example, in response to reception of advice information transmitted from the management apparatus 4, the scale processing unit 62 displays display information corresponding to the advice information on the scale display unit 63. Further, for example, in response to reception of advice information transmitted from the management apparatus 4, the scale processing unit 62 outputs corresponding speech information (including a warning tone) from the scale output unit 66.

The scale processing unit 62 transmits predetermined information to the management apparatus 4 as appropriate. For example, the scale processing unit 62 transmits an additional-filling-operation performing notification to the management apparatus 4 in accordance with command input by the operator. Further, the scale processing unit 62, for example, transmits an additional-filling-operation performing notification or a report to the management apparatus 4 in accordance with command input by the operator. More specifically, the scale processing unit 62 includes a creation unit 621 (report creation unit) and a transmission unit 622 (report transmission unit). On the basis of input by the operator, the creation unit 621 creates an additional-filling-operation performing notification that includes apparatus information and refrigerant type identification information regarding the refrigeration cycle apparatus 1 for which an additional filling operation is performed. On the basis of input by the operator, the creation unit 621 creates a report that includes data (mass correlation data) including the result of measurement by the measuring device 6, apparatus information, and refrigerant type identification information regarding the refrigeration cycle apparatus 1 for which an additional filling operation is completed. In accordance with command input by the operator, the transmission unit 622 transmits the additional-filling-operation performing notification or the report created by the creation unit 621 to the management apparatus 4 via the scale communication unit 65.

The scale display unit 63 ("display unit", "advice information output unit") displays various types of information. The scale display unit 63, for example, displays an input screen for inputting various commands. For example, the scale display unit 63 displays the result of weighing by the weighing unit 61. Further, for example, the scale display unit 63 displays the value of the weight (mass correlation data described below) of the refrigerant container 80 put on the weighing unit 61. Accordingly, the operator can grasp a changes in the weight of the refrigerant container 80 during an additional filling operation. Further, for example, the scale display unit 63 (advice information output unit) displays predetermined display information for the operator on the basis of advice information transmitted from the management apparatus 4. For example, the scale display unit 63 displays a target value regarding the amount of refrigerant (additional filling amount) with which the refrigeration cycle apparatus 1 is filled, on the basis of the advice information.

The scale input unit 64 is an interface for inputting various types of information. For example, a terminal input unit 52 is implemented as physical keys and/or a touch screen. To the scale input unit 64, for example, a command for creating and transmitting to the management apparatus 4 an additional-filling-operation performing notification or a report is input by the operator. The command includes a command for inputting or specifying, for example, apparatus information and/or refrigerant type identification information, which are the contents of the additional-filling-operation performing notification to be transmitted to the management apparatus 4. Further, the command includes a command for inputting or specifying apparatus information, refrigerant type identification information, and/or mass correlation data, which are the contents of the report to be transmitted to the management apparatus 4.

The scale communication unit 65 has a communication module and an antenna for transmitting and receiving data to and from the management apparatus 4 via the communication network NW1.

The scale output unit 66 ("warning tone output unit") includes a speaker and outputs speech information. The scale output unit 66 (advice information output unit, warning tone output unit), for example, outputs predetermined speech information and/or a warning tone for the operator on the basis of advice information transmitted from the management apparatus 4.

(4) Operator Terminal

Now, the operator terminal 5 is described. The operator terminal 5 is an information processing device that is carried by an operator who performs an additional filling operation of filling the refrigeration cycle apparatus 1 with refrigerant. As the operator terminal 5, for example, a mobile terminal, such as a smartphone or a tablet PC, or a laptop personal computer is assumed; however, the operator terminal 5 may be another type of information processing device. The operator terminal 5 wirelessly communicates with the management apparatus 4 via the communication network NW1. In the operator terminal 5, an application for implementing data input and data output related to communication with the management apparatus 4 is installed.

The operator terminal 5 has a terminal storage unit 51, a terminal input unit 52, a terminal output unit 53, a terminal processing unit 54, and a terminal communication unit 55.

The terminal storage unit 51 is for storing various types of information and is constituted by, for example, a nonvolatile memory and a volatile memory. For example, the terminal storage unit 51 stores a program for executing various functions of the operator terminal 5. Further, for example, the terminal storage unit 51 stores information transmitted from the management apparatus 4 and other devices.

The terminal input unit 52 is an interface for inputting various types of information. For example, the terminal input unit 52 is implemented as, for example, a keyboard, a mouse, and/or a touch screen. To the terminal input unit 52, for example, a command for creating and transmitting to the management apparatus 4 an additional-filling-operation performing notification or a report is input by the operator. The command includes a command for inputting or specifying, for example, apparatus information and/or refrigerant type identification information, which are the contents of the additional-filling-operation performing notification to be transmitted to the management apparatus 4. Further, the command includes a command for inputting or specifying apparatus information, refrigerant type identification information, and/or mass correlation data, which are the contents of the report to be transmitted to the management apparatus 4.

The terminal output unit 53 ("display unit", "advice information output unit", "warning tone output unit") outputs various types of information. The terminal output unit 53 includes a display and displays information. The terminal output unit 53, for example, displays an input screen for inputting various commands. The terminal output unit 53 includes a speaker and outputs speech information. For example, the terminal output unit 53 (advice information output unit) displays predetermined display information for the operator on the basis of advice information transmitted from the management apparatus 4. Further, for example, the terminal output unit 53 outputs predetermined speech information and/or a warning tone on the basis of advice information transmitted from the management apparatus 4. For example, the scale display unit 63 displays a target value regarding the amount of refrigerant (additional filling amount) with which the refrigeration cycle apparatus 1 is filled, on the basis of the advice information.

The terminal processing unit 54 performs various types of information processing in the operator terminal 5. The terminal processing unit 54, for example, transmits various types of data to the management apparatus 4 via the terminal communication unit 55. The terminal processing unit 54 stores data received via the terminal communication unit 55 in the terminal storage unit 51. Further, the terminal processing unit 54 outputs information received from the management apparatus 4 via the terminal output unit 53. In response to reception of advice information transmitted from the management apparatus 4, the terminal processing unit 54, for example, outputs display information or speech information (including a warning tone) corresponding to the advice information via the terminal output unit 53.

Further, the terminal processing unit 54 transmits predetermined information to the management apparatus 4 as appropriate. For example, the terminal processing unit 54 transmits an additional-filling-operation performing notification to the management apparatus 4 in accordance with command input by the operator. The terminal processing unit 54, for example, transmits a report to the management apparatus 4 in accordance with command input by the operator. More specifically, the terminal processing unit 54 includes a creation unit 541 (report creation unit) and a transmission unit 542 (report transmission unit). The creation unit 541 creates a report that includes any of the data (mass correlation data) including the result of measurement by the measuring device 6, apparatus information, or refrigerant type identification information on the basis of input by the operator. The transmission unit 542 transmits the report created by the creation unit 541 to the management apparatus 4 via the terminal communication unit 55 in accordance with command input by the operator.

The terminal communication unit 55 includes a communication module for a connection with the communication network NW1. The terminal communication unit 55 communicates with the management apparatus 4 via the communication network NW1.

(5) Management Apparatus

Now, the management apparatus 4 is described. The management apparatus 4 has a storage unit 41, an input unit 42, a communication unit 43, a processing unit 44, and an output unit 45.

The storage unit 41 stores various types of information and includes, for example, a ROM, a RAM, and/or a hard disk. The storage unit 41 stores a program for executing various functions of the management apparatus 4. The storage unit 41 includes a first storage unit 41A, a second storage unit 41B, a third storage unit 41C, a fourth storage unit 41D, a fifth storage unit 41E, and a sixth storage unit 41F.

The first storage unit 41A individually stores information related to a plurality of refrigeration cycle apparatuses 1 managed by the management apparatus 4. The first storage unit 41A, for example, stores information regarding the facility 2 in which each refrigeration cycle apparatus 1 is installed and information regarding the refrigeration cycle apparatus 1 that is installed in each facility 2. Further, the first storage unit 41A, for example, individually stores information regarding the model, capacity, installation form, and so on of each of the heat source unit 10, the use units 30, and the connection pipes CP1 and CP2 included in each refrigeration cycle apparatus 1.

The second storage unit 41B individually stores various types of information transmitted from the refrigeration cycle apparatuses 1 in association with the refrigeration cycle apparatuses 1.

The third storage unit 41C individually stores various types of information transmitted from the operator terminal 5 or the measuring device 6. For example, the third storage unit 41C stores an additional-filling-operation performing notification transmitted from the operator terminal 5 or the measuring device 6. Further, for example, the third storage unit 41C stores a report transmitted from the operator terminal 5 or the measuring device 6. In the third storage unit 41C, various types of information (apparatus information, refrigerant type identification information, mass correlation data, and so on) included in an additional-filling-operation performing notification or in a report are associated with one another and stored.

The fourth storage unit 41D individually stores the amount of refrigerant (initial filling amount) with which each refrigeration cycle apparatus 1 is filled before additional filling in association with information for identifying the refrigeration cycle apparatus 1.

The fifth storage unit 41E individually stores the additional filling amount of each refrigeration cycle apparatus 1 in association with corresponding apparatus information.

The sixth storage unit 41F individually stores the refrigerant filling amount (the sum of the initial filling amount and the additional filling amount) of each refrigeration cycle apparatus 1 in association with information for identifying the refrigeration cycle apparatus 1.

Note that the storage unit 41 includes a storage unit other than the above-described storage units and can store any information.

The input unit 42 is an interface for inputting information to the management apparatus 4. For example, the input unit 42 is implemented as, for example, a keyboard, a mouse, and/or a touch screen. The administrator can input various commands via the input unit 42.

The communication unit 43 is an interface for communicating with other devices via the communication network NW1. The communication unit 43 includes a communication module and electric components for a connection with the communication network NW1.

The communication unit 43, for example, receives various types of information from the refrigeration cycle apparatuses 1. The communication unit 43, for example, receives an additional-filling-operation performing notification and a report from the operator terminal 5 or the measuring device 6. Information received by the communication unit 43 is stored in the storage unit 41 as appropriate. When receiving an additional-filling-operation performing notification from the operator terminal 5 or the measuring device 6, the communication unit 43 establishes a communication connection with the transmission source device.

The processing unit 44 is a functional unit that performs various types of information processing in the management apparatus 4. The processing unit 44 includes an MPU, a cash memory, and so on. The processing unit 44 has an obtaining unit 441, a calculation unit 442, and an information creation unit 443.

The obtaining unit 441 ("mass correlation data obtaining unit") obtains various types of information from the communication network NW1 via the communication unit 43. The obtaining unit 441, for example, receives and stores in the third storage unit 41C an additional-filling-operation performing notification transmitted from the operator terminal 5 or the measuring device 6. Further, for example, when receiving a report transmitted from the operator terminal 5 or the measuring device 6, the obtaining unit 441 stores mass correlation data and corresponding apparatus information and refrigerant type identification information in the third storage unit 41C in association with each other. In other words, the obtaining unit 441 communicates with the measuring device 6 (scale 60) that measures the weight of the refrigerant container 80 and obtains data (mass correlation data) regarding the result of measurement.

The calculation unit 442 ("additional-filling-amount determination unit") performs various calculations regarding processing by the management apparatus 4. For example, in response to reception of mass correlation data from the operator terminal 5 or the scale 60, the calculation unit 442 calculates the amount of refrigerant (additional filling amount) with which the refrigeration cycle apparatus 1 corresponding to the mass correlation data has been additionally filled. Specifically, the calculation unit 442 calculates the additional filling amount, which is the amount of refrigerant with which the refrigeration cycle apparatus 1 has been additionally filled, on the basis of the type of refrigerant identified with the refrigerant type identification information and the result of weighing by the weighing unit 61 identified with the mass correlation data. In other words, the calculation unit 442 determines the additional filling amount on the basis of the mass correlation data. The calculation unit 442 stores the calculated additional filling amount in the fifth storage unit 41E in association with the corresponding apparatus information. Accordingly, the additional filling amount, which is the amount of refrigerant with which the refrigeration cycle apparatus 1 has been additionally filled, can be managed.

The information creation unit 443 generates, in response to reception of an additional-filling-operation performing notification from the operator terminal 5 or the measuring device 6, advice information and transmits the advice information to the device (operator terminal 5 or measuring device 6) that has transmitted the additional-filling-operation performing notification. The "advice information" is display information and/or speech information indicating an advice that is given to the operator regarding additional filling of the refrigeration cycle apparatus 1 with refrigerant. The speech information here includes a warning tone.

For example, the advice information is information indicating as appropriate a target value regarding the amount of refrigerant (additional filling amount) with which the refrigeration cycle apparatus 1 is filled. For example, the advice information is information indicating to the operator a procedure for performing additional filling with refrigerant. For example, the advice information is information, regarding an operation of the manual valve of the refrigerant container 80 for supplying refrigerant, indicating the timing at which the manual valve is to be narrowed. Further, for example, the advice information is information for giving an instruction for outputting speech information to urge the operator to close the manual valve of the refrigerant container 80 when the filling amount of refrigerant with which the refrigeration cycle apparatus 1 is additionally filled comes closer to a target value.

Further, the information creation unit 443 creates predetermined useful information in accordance with an input command input to the input unit 42 or a request transmitted from other devices. The "useful information" is information that is used in management of the amount of refrigerant. The useful information is, for example, information that is used by the administrator to determine whether the additional filling amount, which is the amount of refrigerant with which the refrigeration cycle apparatus 1 has been additionally filled, is appropriate. The useful information is, for example, a report that is presented to the administrator regarding whether the additional filling amount, which is the amount of refrigerant with which the refrigeration cycle apparatus 1 has been additionally filled, is appropriate. The useful information is, for example, information indicating, for example, the average additional filling amount in a property similar to the refrigeration cycle apparatus 1 that has been additionally filled with refrigerant. The information creation unit 443, for example, creates useful information on the basis of the additional filling amount regarding one refrigeration cycle apparatus 1 and the additional filling amount regarding another refrigeration cycle apparatus 1. Further, for example, when creating useful information, the information creation unit 443 uses various types of information included in apparatus information.

The output unit 45 outputs various types of information. The output unit 45 includes a display that displays information. For example, the output unit 45 outputs, for example, an input screen for accepting input of various types of information.

(6) Flow of Processes in Management System

Figure 6:
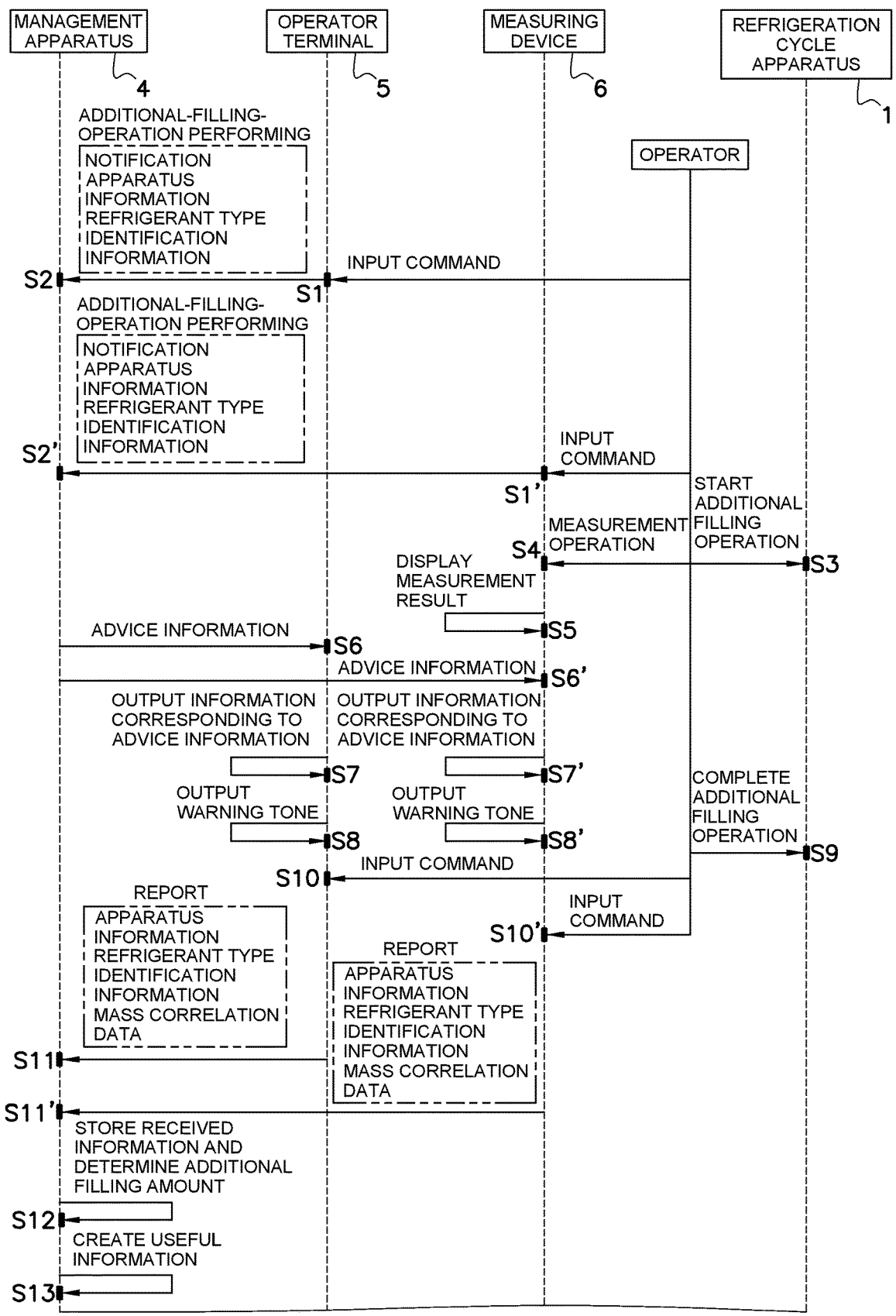
FIG. 6 is a schematic diagram illustrating an example flow of processes in the management system.

FIG. 6 is a schematic diagram illustrating an example flow of processes in the management system 100. In FIG. 6, at least step S1 or SF needs to be performed or both steps may be performed. Similarly, at least step S2 or S2', at least step S6 or S6', at least step S7 or S7', at least step S8 or S8', at least step S10 or S10', and at least step S11 or S11' need to be performed, or both steps S2 and S2', both steps S6 and S6', both steps S7 and S7', both steps S8 and S8', both steps S10 and S10', and both steps S11 and S11' may be performed. Note that the flow of processes illustrated in FIG. 6 is an example and can be changed as appropriate. For example, another step not illustrated may be inserted before or after each step.

In the management system 100, after the refrigeration cycle apparatus 1 has been installed, an additional filling operation with refrigerant is performed by the operator, and in relation to this, a command for transmitting an additional-filling-operation performing notification to the management apparatus 4 is input to the operator terminal 5 or the measuring device 6 by the operator (step S1, S1'). In response to input of the command by the operator, the operator terminal 5 or the measuring device 6 transmits an additional-filling-operation performing notification that includes corresponding apparatus information and refrigerant type identification information to the management apparatus 4 (step S2, S2'). Accordingly, a communication connection is established between the management apparatus 4 and the device (operator terminal 5 or measuring device 6) that has transmitted the additional-filling-operation performing notification. Then, an additional filling operation with refrigerant is started by the operator (step S3).

Simultaneously with the additional filling operation with refrigerant, a measurement operation is performed by the operator (step S4). In the measurement operation, a weight correlating with the amount (mass) of refrigerant for additional filling is measured.

Specifically, in the measurement operation, the refrigerant container 80 from which refrigerant for additional filling is supplied is put on the weighing unit 61 of the scale 60.

The measuring device 6 displays the weight of the refrigerant container 80 as the measurement result during the additional filling operation (step S5).

From the management apparatus 4 that has received the additional-filling-operation performing notification, advice information is transmitted as needed to the device (operator terminal 5 or measuring device 6) that has transmitted the additional-filling-operation performing notification (step S6, S6').

The operator terminal 5 or the measuring device 6 outputs display information and/or speech information corresponding to the received advice information as appropriate (step S7, S7').

When the filling amount of refrigerant with which the refrigeration cycle apparatus 1 is additionally filled comes closer to a target value based on the advice information, the operator terminal 5 or the measuring device 6 outputs a warning tone as appropriate to urge the operator to close the manual valve of the refrigerant container 80 (step S8, S8').

Subsequently, the manual valve of the refrigerant container 80 for supplying refrigerant and the charge port 23 are closed by the operator, and the additional filling operation with refrigerant is completed (step S9).

The operator who has completed the additional filling operation inputs to the operator terminal 5 or the measuring device 6 a command for creating a report as appropriate and transmitting the report to the management apparatus 4 (step S10, S10').

In response to input of the command by the operator, the operator terminal 5 or the measuring device 6 transmits a corresponding report (apparatus information, refrigerant type identification information, and mass correlation data) to the management apparatus 4 (step S11, S11').

When receiving the report from the operator terminal 5 or the measuring device 6, the management apparatus 4 stores the apparatus information, the refrigerant type identification information, and the mass correlation data included in the report in association with one another, and determines and stores the additional filling amount, which is the amount of refrigerant with which the refrigeration cycle apparatus 1 has been filled in the additional filling operation (step S12).

The management apparatus 4 creates useful information as needed on the basis of the contents of the received report (step S13).

(7) Features (7-1)

The management system 100 according to this embodiment has the obtaining unit 441 that obtains mass correlation data, the calculation unit 442, and the storage unit 41. The mass correlation data is data correlating with the mass of the refrigerant container 80 from which refrigerant is supplied to the refrigeration cycle apparatus 1 that is additionally filled with refrigerant. The calculation unit 442 determines the additional filling amount on the basis of the mass correlation data. The additional filling amount is the amount of refrigerant, from the refrigerant container 80, with which the refrigeration cycle apparatus 1 has been additionally filled. The storage unit 41 stores apparatus information regarding the refrigeration cycle apparatus 1 for which additional filling with refrigerant is completed and the additional filling amount that is the amount of refrigerant with which the refrigeration cycle apparatus 1 identified with the apparatus information has been filled, in association with each other.

Accordingly, when the refrigeration cycle apparatus 1 is additionally filled with refrigerant, the mass correlation data correlating with the mass of the refrigerant container 80 from which refrigerant is supplied is obtained, and the additional filling amount of refrigerant for the refrigeration cycle apparatus 1 is determined on the basis of the obtained mass correlation data. As a result, regarding additional filling of the refrigeration cycle apparatus 1 with refrigerant performed at the installation site, the additional filling amount can be managed with high accuracy. Accordingly, it can be determined with high accuracy whether the additional filling amount is appropriate.

(7-2)

In the management system 100 according to this embodiment, the mass correlation data is the weight of the refrigerant container 80. The obtaining unit 441 communicates with the scale 60 that measures the weight of the refrigerant container 80 to receive data regarding the result of measurement from the scale 60. Accordingly, when the refrigeration cycle apparatus 1 is additionally filled with refrigerant, the mass correlation data correlating with the mass of the refrigerant container 80 from which refrigerant is supplied can be obtained directly from the scale 60 that measures the weight of the refrigerant container 80.

(7-3)

In this embodiment, the management system 100 has a display unit (terminal output unit 53, scale output unit 66) that displays the mass correlation data (the result of measurement by the measuring device 6) and/or the additional filling amount (target value). Accordingly, when the refrigeration cycle apparatus 1 is additionally filled with refrigerant, the operator can grasp the mass correlation data and/or the additional filling amount as appropriate.

(7-4)

In this embodiment, the management system 100 has "advice information output unit" (terminal output unit 53, scale display unit 63, scale output unit 66) that outputs on the basis of the additional filling amount, advice information for the operator performing additional filling regarding an optimum filling amount of refrigerant, from the refrigerant container 80, with which the refrigeration cycle apparatus 1 is to be filled. Accordingly, when the refrigeration cycle apparatus 1 is additionally filled with refrigerant, the operator can grasp the advice information regarding the optimum filling amount as appropriate.

(7-5)

In this embodiment, the management system 100 has a warning tone output unit (terminal output unit 53, scale output unit 66) that outputs a warning tone when the additional filling amount comes closer to a target value. Accordingly, when the refrigeration cycle apparatus 1 is additionally filled with refrigerant, the operator can grasp as appropriate a situation where the additional filling amount comes closer to the target value. In other words, the operator can grasp in advance the timing at which the additional filling operation is to end.

(7-6)

In this embodiment, the calculation unit 442 of the management system 100 calculates the additional filling amount in accordance with the apparatus information that includes an environmental condition. Accordingly, the additional filling amount can be calculated as appropriate in relation to the environmental condition.

(7-7)

In this embodiment, the storage unit 41 of the management apparatus 4 is installed at a remote site away from the refrigeration cycle apparatus 1. Accordingly, regarding additional filling of the refrigeration cycle apparatus 1 with refrigerant, the additional filling amount can be managed with high accuracy by using the storage unit 41 disposed at the remote site away from the refrigeration cycle apparatus 1.

(7-8)

In this embodiment, the management apparatus 4 includes the storage unit 41. The report creation unit (541, 621) creates a report. The report is information that includes the apparatus information and information regarding the additional filling amount corresponding to the apparatus information. The report transmission unit (542, 622) transmits the report to the management apparatus 4. Accordingly, the report that includes the apparatus information and the information regarding the additional filling amount is transmitted to the management apparatus 4. As a result, regarding additional filling of the refrigeration cycle apparatus 1 with refrigerant, the additional filling amount can be managed with high accuracy by using the management apparatus 4 disposed at the remote site away from the refrigeration cycle apparatus 1.

(7-9)

The management system 100 in this embodiment can be constituted by the management apparatus 4, the operator terminal 5, and the measuring device 6. However, in addition to these, the management system 100 may include the refrigeration cycle apparatus 1 or another device as a constituent element of the management system 100.

(7-10)

In the management system 100 in this embodiment, the obtaining unit 441 of the management apparatus 4 is described as "mass correlation data obtaining unit" that obtains mass correlation data. However, from another viewpoint, the mass correlation data is directly measured by the scale 60 (measuring device 6). Accordingly, the scale 60 that measures the weight of the refrigerant container 80 can be interpreted as "mass correlation data obtaining unit". Based on such interpretation, the management system 100 can be considered to have the scale 60 that measures the weight of the refrigerant container 80 as "mass correlation data obtaining unit" that obtains the mass correlation data, which is the weight of the refrigerant container 80.

(8) Modifications

The above-described embodiment can be modified as appropriate as indicated by the following modifications. Note that each modification may be applied by combining with other modifications as long as no contradiction arises.

(8-1) Modification 1

In the above-described embodiment, functional units including the obtaining unit 441, the calculation unit 442, the fifth storage unit 41E, and so on are included in the management apparatus 4 disposed at a remote site away from the installation place of the refrigeration cycle apparatus 1. However, any of the functional units (41A to 41F, 441, 442, 443, and so on) included in the management apparatus 4 may be included in a local device different form the management apparatus 4. In other words, any or all of the functional units including the obtaining unit 441, the calculation unit 442, the fifth storage unit 41E, and so on may be included in a device that is disposed in the installation place of the refrigeration cycle apparatus 1.

(8-2) Modification 2

In the above-described embodiment, the management apparatus 4 is disposed in the management center 3 but may be disposed in another place. For example, the management apparatus 4 may be disposed in the facility 2.

Further, for example, the management apparatus 4 need not be constituted as one device and may be configured to implement the functional units (41, 41A to 41F, 42, 43, 44, 45, 441, 442, and 443) by connecting a plurality of devices over a network. In such a case, the devices that constitute the management apparatus 4 may be separately disposed at different locations. For example, any of the controller CT, the operator terminal 5, the measuring device 6, devices disposed in the management center 3, and other devices may be combined to constitute the management apparatus 4.

(8-3) Modification 3

In the above-described embodiment, a description is given under the assumption that the communication network NW1 includes a WAN (wide area network) that extends over a plurality of properties; however, the configuration form of the communication network NW1 can be changed as appropriate. For example, the communication network NW1 may be constituted by only a LAN (local area network). In other words, the communication network NW1 may be formed in the data link layer of the OSI reference model.

(8-4) Modification 4

The above-described embodiment states that the operator terminal 5 and the measuring device 6 are connected to the communication network NW1 by wireless communication. However, the operator terminal 5 and/or the measuring device 6 may be connected to the communication network NW1 by wired communication. For example, the operator terminal 5 and/or the measuring device 6 may be connected to the controller CT or another communication device by a communication cable, thereby being connected to the communication network NW1.

(8-5) Modification 5

In the above-described embodiment, the operator terminal 5 and the measuring device 6 individually access the communication network NW1. However, the operator terminal 5 and the measuring device 6 may be configured to be accessible to the communication network NW1 by one of the operator terminal 5 or the measuring device 6 being connected to the other.

In other words, one of the operator terminal 5 or the measuring device 6 may access the communication network NW1 via the other.

(8-6) Modification 6

In the above-described embodiment, apparatus information is transmitted from the operator terminal 5 or the measuring device 6 to the management apparatus 4. However, apparatus information may be transmitted from other devices. For example, apparatus information may be transmitted from the controller CT of the refrigeration cycle apparatus 1. Further, apparatus information may be input to the management apparatus 4 via the input unit 42.

(8-7) Modification 7

Information included in apparatus information is not limited to those illustrated in the above-described embodiment and can be changed as appropriate in accordance with the installation environment or engineering specifications.

(8-8) Modification 8

Useful information created by the information creation unit 443 is not limited to those illustrated in the above-described embodiment and can be changed as appropriate in accordance with the installation environment or engineering specifications.

(8-9) Modification 9

In the above-described embodiment, the measuring device 6 has functional units including the scale communication unit 65, the scale input unit 64, and so on. However, the measuring device 6 need not include all of the functional units 61 to 66. For example, the measuring device 6 need not have a communication function, and the scale communication unit 65 may be omitted. Further, for example, the measuring device 6 need not have the scale input unit 64.

In a case where the measuring device 6 is a weighing instrument having no communication function, the scale processing unit 62 can be omitted as appropriate. In such a case, the operator may transmit data obtained by capturing an image of the result of measurement displayed on the scale display unit 63 to the management apparatus 4 from the operator terminal 5 or another device as mass correlation data.

Figure 7:
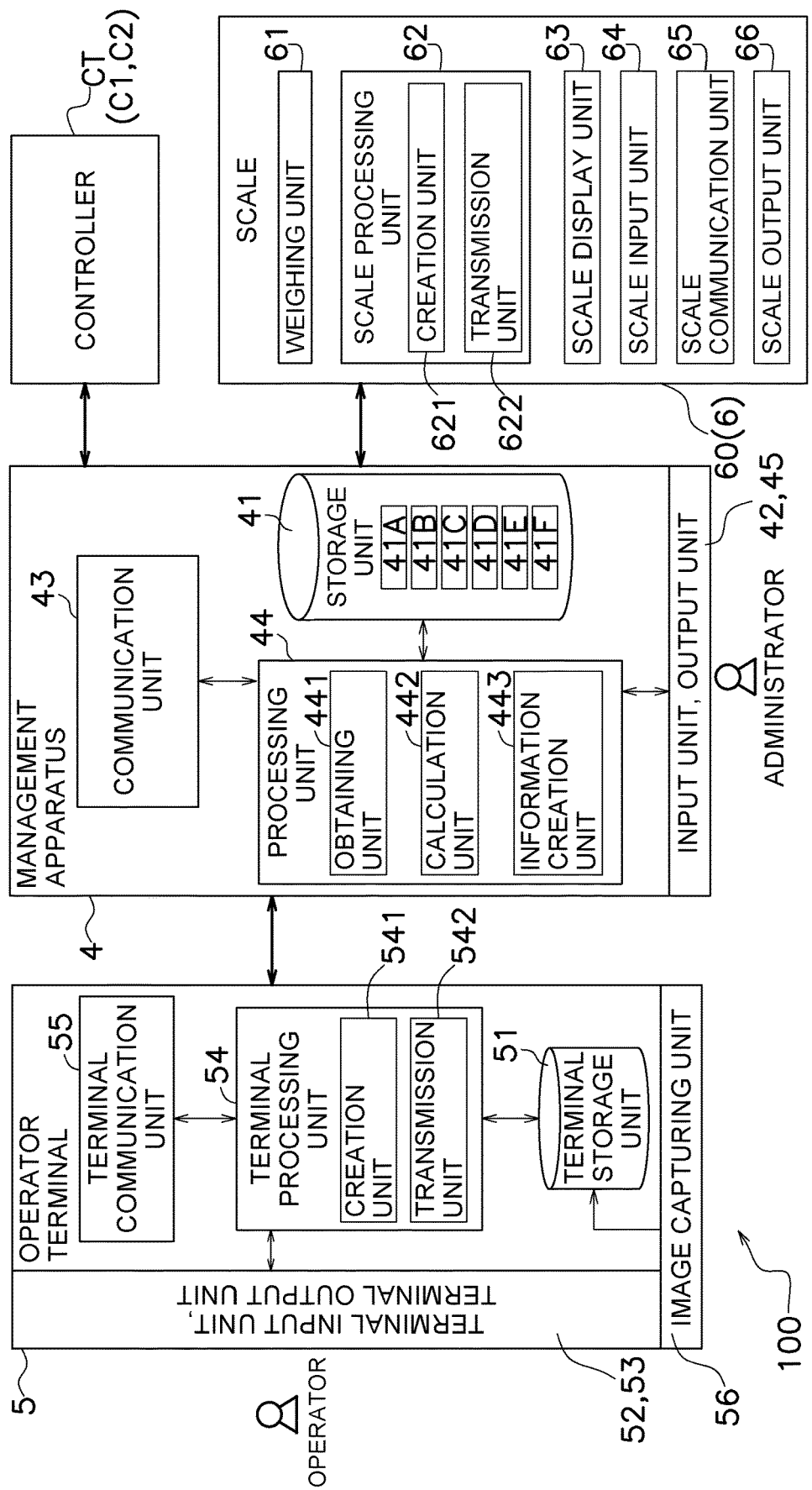
FIG. 7 is a block diagram illustrating an overall configuration of the management system according to Modification 8.

For example, as illustrated in FIG. 7, in a case where the operator terminal 5 has an image capturing unit 56 that includes a lens and an imaging element, at the time of an additional filling operation, an image of a display portion (scale display unit 63) that displays the result of measurement by the scale 60 measuring the weight of the refrigerant container 80 may be captured by the image capturing unit 56. Data obtained by image capturing may be transmitted to the management apparatus 4 by the terminal processing unit 54 as appropriate as mass correlation data. In such a case, the image capturing unit 56 can be interpreted as "mass correlation data obtaining unit" that directly obtains mass correlation data, which is the weight of the refrigerant container 80. Accordingly, when the refrigeration cycle apparatus 1 is additionally filled with refrigerant, mass correlation data correlating with the mass of the refrigerant container 80 from which refrigerant is supplied can be obtained by using the scale 60 having no communication function. Note that the image capturing unit 56 may be included in a device different from the operator terminal 5.

(8-10) Modification 10

The above-described embodiment states that the measuring device 6 and the operator terminal 5 are separate devices. However, the measuring device 6 and the operator terminal 5 need not be separate devices, and the operator terminal 5 may be included in the measuring device 6.

(8-11) Modification 11

In the above-described embodiment, in a measurement operation at the time of additional filling with refrigerant, the refrigerant container 80 from which refrigerant for additional filling is supplied is put on the weighing unit 61 of the scale 60 to thereby measure the weight of the refrigerant container 80, and the additional filling amount, which is the amount of refrigerant with which the refrigeration cycle apparatus 1 has been additionally filled, is determined. However, the form in which the additional filling amount is measured need not be limited to this and can be changed as appropriate.

For example, the heat source unit 10 may be put on the weighing unit 61 of the scale 60, and a weight corresponding to the additional filling amount may be measured on the basis of the difference value between the weight of the heat source unit 10 before additional filling and that of the heat source unit 10 after additional filling.

Figure 8:
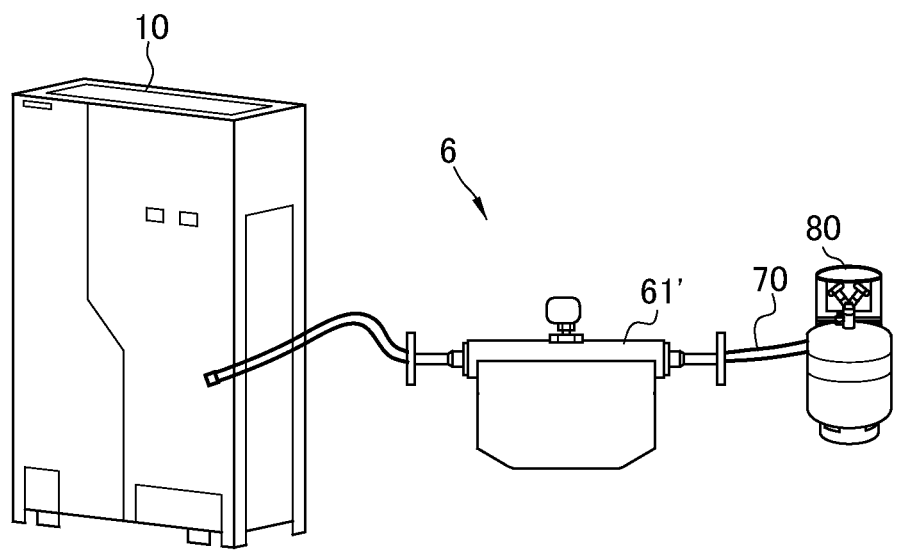
FIG. 8 is a schematic diagram illustrating a flow rate measurement unit according to Modification 10.

Further, for example, instead of the weighing unit 61 that measures a weight, the measuring device 6 may have a flow rate measurement unit 61' as illustrated in FIG. 8. FIG. 8 illustrates a state where the flow rate measurement unit 61' is disposed on the charge hose 70 that connects the heat source unit 10 and the refrigerant container 80 with each other. In such a case, at the time of additional filling with refrigerant, the flow rate of refrigerant that is supplied from the refrigerant container 80 to the heat source unit 10 is measured by the flow rate measurement unit 61', and the additional filling amount is determined on the basis of the measurement value. The result of measurement by the flow rate measurement unit 61' is transmitted to the management apparatus 4 from the measuring device 6, the operator terminal 5, or another device as mass correlation data. In such a case, the flow rate of refrigerant correlates with the mass of the refrigerant container 80, and therefore, the flow rate measurement unit 61' can be interpreted as "mass correlation data obtaining unit" that directly obtains mass correlation data.

(8-12) Modification 12

Further, for example, the liquid level of refrigerant encapsulated in the refrigerant container 80 may be measured to calculate the additional filling amount. Specifically, on the basis of the difference value between the liquid level of refrigerant in the refrigerant container 80 before completion of an additional filling operation and that after completion of the additional filling operation, the additional filling amount, which is the amount of refrigerant with which the refrigeration cycle apparatus 1 has been additionally filled, may be determined.

Figure 9:
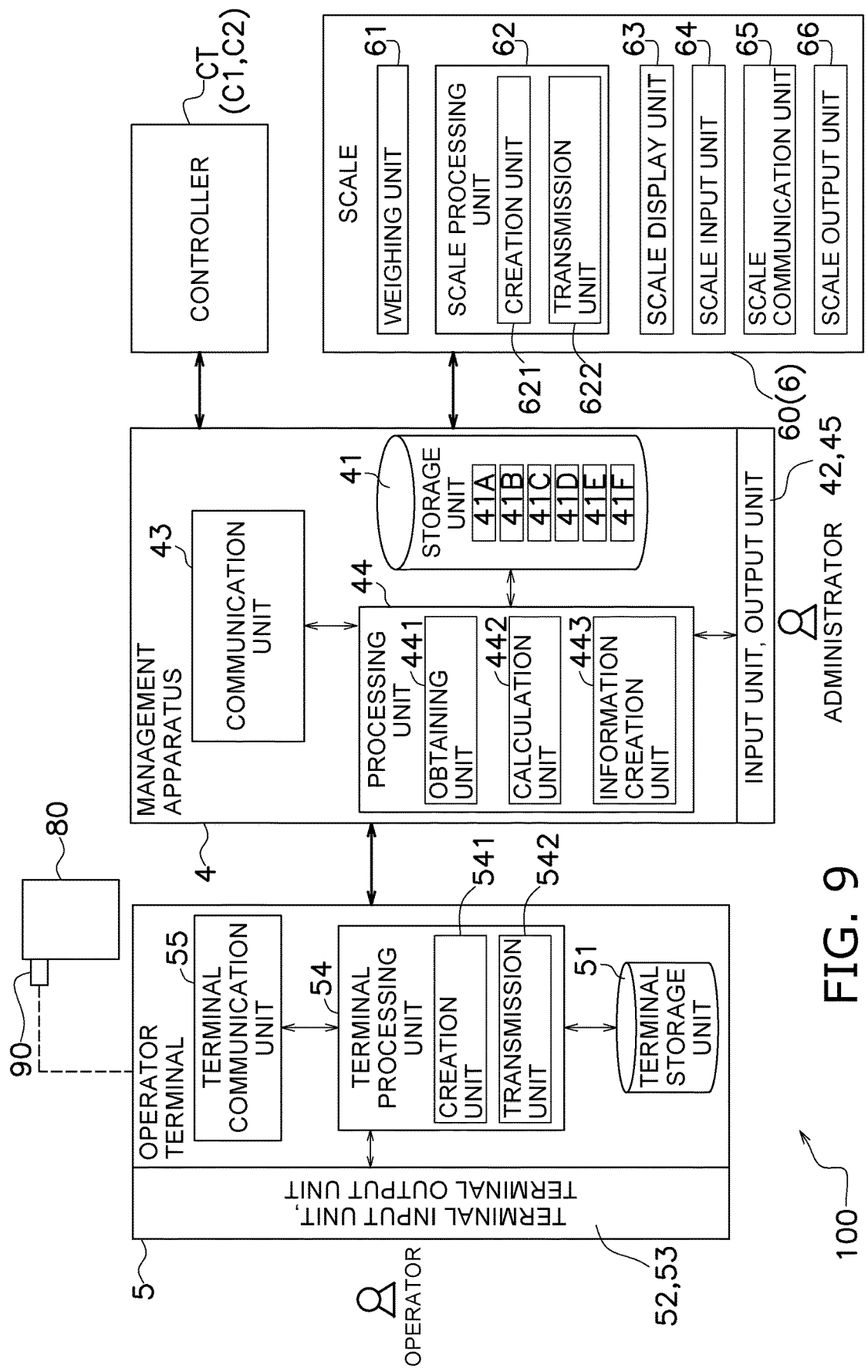
FIG. 9 is a block diagram illustrating an overall configuration of the management system according to Modification 11.

For example, as illustrated in FIG. 9, a liquid level sensor 90 is disposed in the refrigerant container 80, and the liquid level sensor 90 is connected to the operator terminal 5 or another device such that communication is possible. A detection value obtained by the liquid level sensor 90 in the refrigerant container 80 before additional filling and that obtained by the liquid level sensor 90 after additional filling may be transmitted to the management apparatus 4 from the operator terminal 5 or another device. In such a case, the liquid level of refrigerant in the refrigerant container 80 correlates with the mass of the refrigerant container 80, and therefore, the liquid level sensor 90 can be interpreted as "mass correlation data obtaining unit" that directly obtains mass correlation data.

(8-13) Modification 13

In the above-described embodiment, the management apparatus 4 (calculation unit 442) calculates the additional filling amount, which is the amount of refrigerant with which the refrigeration cycle apparatus 1 has been additionally filled, on the basis of mass correlation data transmitted from the operator terminal 5 or the measuring device 6. However, the additional filling amount may be calculated by a device other than the management apparatus 4. For example, the operator terminal 5, the measuring device 6, or another device may calculate the additional filling amount on the basis of the result of measurement by the measuring device 6 and transmit the calculated value to the management apparatus 4. In such a case, for example, the additional filling amount may be calculated by, for example, the terminal processing unit 54 of the operator terminal 5 or the scale processing unit 62 of the measuring device 6.

In such a case, the additional filling amount may be displayed by the terminal output unit 53 of the terminal processing unit 54 or the scale display unit 63 of the scale 60.

Accordingly, the operator can grasp the additional filling amount.

(8-14) Modification 14

In an additional filling operation, information that indicates a relationship between the amount of refrigerant, from the refrigerant container 80, with which the refrigeration cycle apparatus 1 has been filled and a target value of the additional filling amount may be displayed on the operator terminal 5 or the measuring device 6. In other words, information that indicates a relationship between, of the amount of refrigerant that is planned to be supplied for filling in an additional filling operation, the amount of refrigerant with which the refrigeration cycle apparatus 1 has already been filled and the amount of refrigerant before filling may be displayed on the operator terminal 5 or the measuring device 6. For example, information that indicates the difference value or ratio between the amount of refrigerant, from the refrigerant container 80, with which refrigeration cycle apparatus 1 has been filled and a target value of the additional filling amount may be displayed on the operator terminal 5 or the measuring device 6. Accordingly, the operator can grasp the degree of progress in the additional filling operation in real time.

Note that such information may be transmitted from the management apparatus 4 as advice information or may be generated by the operator terminal 5 or the measuring device 6. Further, a communication connection may be established between the operator terminal 5 and the measuring device 6, and the information may be transmitted from the measuring device 6 to the operator terminal 5 and displayed on the operator terminal.

(8-15) Modification 15

In the above-described embodiment, the controller CT in which the heat-source-side control unit C1 and the use-side control unit C2 are connected to each other such that communication is possible and cooperate with each other to control operations of the refrigeration cycle apparatus 1 is configured. However, the configuration form of the controller CT of the refrigeration cycle apparatus 1 need not be limited to this and can be changed as appropriate. For example, a remote controller not illustrated may be included as a constituent device of the controller CT. Further, a central management device (not illustrated) that transmits commands to a plurality of refrigeration cycle apparatuses 1 may be included as a constituent device of the controller CT.

(8-16) Modification 16

The configuration form of the refrigerant circuit RC described in the above-described embodiment can be changed as appropriate. For example, the refrigerant circuit RC may include a device not illustrated in FIG. 3. Further, for example, any of the devices illustrated in FIG. 3 as a constituent device of the refrigerant circuit RC may be omitted.

Additional Statement

Although an embodiment has been described above, it should be understood that various changes can be made to the forms and details without departing from the spirit and scope stated in the claims.

Industrial Applicability

The present disclosure can be used in an additional-filling-amount management system.

What is claimed is:

1. An additional-filling-amount management system for managing a refrigerant filling amount with which a refrigeration cycle apparatus installed in each of a plurality of facilities is additionally filled, the additional-filling-amount management system comprising:
a processor including a mass correlation data obtaining unit and an additional-filling-amount determination unit; and
a computer storage including a storage unit,
the mass correlation data obtaining unit being configured to obtain mass correlation data correlating with a mass of a refrigerant container from which refrigerant is supplied to the refrigeration cycle apparatus that is additionally filled with refrigerant;
the additional-filling-amount determination unit being configured to determine an additional filling amount based on the mass correlation data, the additional filling amount being an amount of refrigerant, from the refrigerant container, with which the refrigeration cycle apparatus has been additionally filled; and
the storage unit storing apparatus information regarding the refrigeration cycle apparatus for which additional filling with refrigerant is completed and the additional filling amount that is the amount of refrigerant with which the refrigeration cycle apparatus identified with the apparatus information has been filled, in association with each other.

2. The additional-filling-amount management system according to claim 1, wherein
the mass correlation data is a weight of the refrigerant container, and
the mass correlation data obtaining unit is a scale configured to measure the weight of the refrigerant container.

3. The additional-filling-amount management system according to claim 2, further comprising:
a display unit that displays at least one of the mass correlation data and the additional filling amount.

4. The additional-filling-amount management system according to claim 2, further comprising:
an advice information output unit configured to output based on the additional filling amount, advice information for an operator performing additional filling regarding an optimum filling amount of refrigerant, from the refrigerant container, with which the refrigeration cycle apparatus is to be filled.

5. The additional-filling-amount management system according to claim 1, wherein
the mass correlation data is a liquid level of refrigerant encapsulated in the refrigerant container, and
the mass correlation data obtaining unit is a sensor configured to detect the liquid level of the refrigerant encapsulated in the refrigerant container.

6. The additional-filling-amount management system according to claim 5, further comprising:
a display unit that displays at least one of the mass correlation data and the additional filling amount.

7. The additional-filling-amount management system according to claim 5, further comprising:
an advice information output unit configured to output based on the additional filling amount, advice information for an operator performing additional filling regarding an optimum filling amount of refrigerant, from the refrigerant container, with which the refrigeration cycle apparatus is to be filled.

8. The additional-filling-amount management system according to claim 1, wherein
the mass correlation data is a weight of the refrigerant container, and
the mass correlation data obtaining unit is configured to communicate with a scale that measures the weight of the refrigerant container to receive data regarding a result of measurement from the scale.

9. The additional-filling-amount management system according to claim 8, further comprising:
a display unit that displays at least one of the mass correlation data and the additional filling amount.

10. The additional-filling-amount management system according to claim 8, further comprising:
an advice information output unit configured to output based on the additional filling amount, advice information for an operator performing additional filling regarding an optimum filling amount of refrigerant, from the refrigerant container, with which the refrigeration cycle apparatus is to be filled.

11. The additional-filling-amount management system according to claim 1, wherein
the mass correlation data is a weight of the refrigerant container, and
the mass correlation data obtaining unit is an image capturing unit configured to capture an image of a display portion displaying a result of measurement by a scale that measures the weight of the refrigerant container.

12. The additional-filling-amount management system according to claim 11, further comprising:
a display unit that displays at least one of the mass correlation data and the additional filling amount.

13. The additional-filling-amount management system according to claim 11, further comprising:
an advice information output unit configured to output based on the additional filling amount, advice information for an operator performing additional filling regarding an optimum filling amount of refrigerant, from the refrigerant container, with which the refrigeration cycle apparatus is to be filled.

14. The additional-filling-amount management system according to claim 1, further comprising:
a display unit that displays at least one of the mass correlation data and the additional filling amount.

15. The additional-filling-amount management system according to claim 1, further comprising:
an advice information output unit configured to output based on the additional filling amount, advice information for an operator perforating additional filling regarding an optimum filling amount of refrigerant, from the refrigerant container, with which the refrigeration cycle apparatus is to be filled.

16. The additional-filling-amount management system according to claim 1, further comprising:
a warning tone output unit configured to output a warning tone when the additional filling amount approaches a target value.

17. The additional-filling-amount management system according to claim 1, wherein
the additional-filling-amount determination unit is further configured to calculate the additional filling amount in accordance with an environmental condition.

18. The additional-filling-amount management system according to claim 1, wherein
the storage unit is installed at a remote site away from the refrigeration cycle apparatus.

19. The additional-filling-amount management system according to claim 1, further comprising:
a management apparatus that includes the storage unit;
a report creation unit configured to create a report including the apparatus information and information regarding the additional filling amount corresponding to the apparatus information; and
a report transmission unit configured to transmit the report to the management apparatus.

* * * * *